(12) United States Patent
Parker et al.

(10) Patent No.: US 10,963,788 B1
(45) Date of Patent: Mar. 30, 2021

(54) ANALYTIC SYSTEM FOR INTERACTIVE GRAPHICAL MODEL SELECTION

(71) Applicant: SAS Institute Inc., Cary, NC (US)

(72) Inventors: Ryan Jeremy Parker, Raleigh, NC (US); Clayton Adam Barker, Cary, NC (US); Christopher Michael Gotwalt, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/919,309

(22) Filed: Jul. 2, 2020

Related U.S. Application Data

(60) Provisional application No. 62/964,906, filed on Jan. 23, 2020, provisional application No. 62/944,110, filed on Dec. 5, 2019.

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| | | | |
|---|---|---|---|
| 6,882,958 B2 | 4/2005 | Schmidt et al. | |
| 7,194,394 B2 | 3/2007 | Dorfman et al. | |
| 8,078,427 B2 | 12/2011 | Tischler et al. | |
| 9,773,211 B2 | 9/2017 | Barker | |
| 2005/0149902 A1* | 7/2005 | Shi | G03F 1/36 716/52 |
| 2010/0177103 A1 | 7/2010 | Grandine | |
| 2013/0030886 A1 | 1/2013 | Poortingga | |
| 2014/0139529 A1 | 5/2014 | Mukai | |
| 2018/0032836 A1* | 2/2018 | Hurter | G06K 9/4638 |
| 2018/0073724 A1* | 3/2018 | Kim | F22B 35/00 |

OTHER PUBLICATIONS

Aexd About Design of Experiments Software, Tutorial Aexd.net, printed Jan. 23, 2020; https://aexd.net/about-software/#aexd.

(Continued)

*Primary Examiner* — Vincent Gonzales
*Assistant Examiner* — Imad Kassim
(74) *Attorney, Agent, or Firm* — Bell & Manning, LLC

(57) ABSTRACT

Graphical interactive model selection is provided. A basis function is fit to each plurality of observation vectors defined for each value of a group variable. Basis results are presented within a first sub-window of a first window of a display. Functional principal component analysis (FPCA) is automatically performed on each basis function. FPCA results are presented within a second sub-window of the first window. An indicator of a request to perform functional analysis using the FPCA results based on a predefined factor variable is received in association with the first window. A model is trained using an eigenvalue and an eigenfunction computed as a result of the FPCA for each plurality of observation vectors using the factor variable value as a model effect. (G) Trained model results are presented within a third sub-window of the first window of the display.

30 Claims, 27 Drawing Sheets

(56) References Cited

OTHER PUBLICATIONS

Madalina Dinita, Best curve fitting software for Windows 10 (2020 guide), Windows Report, printed from the internet Jan. 23, 2020.
Curve Fitting Software|NCSS Statistical Software|NCSS 2019 Data Analysis, printed from the internet Jan. 23, 2020, https://www.ncss.com/software/ncss/curve-fitting-in-ncss/.
Curve and Surface Fitting, OriginLab, printed from the internet Jan. 23, 2020, https://www.originlab.com/index.aspx?go=Products/Origin/DataAnalysis/CurveFitting.
DataFit Product Features, DataFit Curve Fitting and Data Plotting Software Features, Oakdale Engineering, printed from the internet Jan. 23, 2020, www.oakdaleengr.com/datafit.htm.
Ramsay et al., Functional Data Analysis, Package "fda", Jul. 5, 2018.
"Free Software for Curve fitting or best fit equation," questions, printed Jan. 23, 2020from https://www.researchgate.net/post/Free_Software_for_Curve_fittin_or_best-fit_equation.
JMP Design of Experiments Guide, Version 15 JMP, A business Unit of SAS, 2019.
SAS Institute Inc. 2017. JMP® Fitting Linear Models, Version 15, JMP, A business unit of SAS, 2019.
JMP Multivariate Methods, Version 15, JMP, A business unit of SAS, 2019.
JMP Predictive and Specialized Modeling, JMP, A Business Unit of SAS, 2020, Version 15.1.
JMP Predictive and Specialized Modeling, JMP, A Business Unit of SAS, 2019.
JMP Profilers, JMP, A business Unit of SAS, Version 15.1, 2020.
LAB Fit Curve Fitting Software (Nonlinear Regression Program), printed Jan. 23, 2020, www.labfit.net.
Marie Davidian, "Nonlinear Mixed Effects Models, An Overview and Update," JABES 8, 387-419, 2003.
SigmaPlot—Curve Fitting and Regression | Systat Software, Inc., printed Jan. 23, 2020, https://systatsoftware.com/products/sigmaplot/sigmaplot-curve-fitting_and_regression/.
TableCurve 2D—Curve Fitting Made Fast and Easy, printed Jan. 23, 2020, www.sigmaplot.co.uk/produccts/tablecurve2d/tablecurve 2d/php.
Simfit, Simulation, fitting, statistics, and plotting. William G. Bardsley, Reference Manual Version 7.6.2, 2007.
Movahedian et al., A Trefftz method in space and time using exponential basis functions: Application to direct and inverse heat conduction problems, Engineering Analysis with Boundary Elements 37, Apr. 22, 2013, pp. 868-883.
Konidaris et al., Value Function Approximation in Reinforcement Learning Using the Fourier Basis, Proceedings of the Twenty-Fifth AAAI Conference on Artificial Intelligence, Aug. 2011, pp. 380-385.
Eilers et al., Flexible Smoothing with B-splines and Penalties, Statistical Science, vol. 11, No. 2, (1996) pp. 89-121.
SAS Institute Inc. 2011. SAS/STAT® 9.3 User's Guide. Cary, NC: SAS Institute Inc., Jul. 2011.
A. Graps, An Introduction to Wavelets, IEEE Computational Science & Engineering, (1995) pp. 50-61.
C. De Boor, On Calculating with B-Splines, Journal of Approximation Theory 6, 1972, pp. 50-62.
Zhou et al., Spatially Adaptive Regression Splines and Accurate Knot Selection Schemes, Journal of the American Statistical Association 96:453, Mar. 2001, pp. 247-259.
Yuan et al., Adaptive B-spline knot selection using multi-resolution basis set, IIE Transactions 45:12, Sep. 17, 2012, pp. 1263-1277.
SAS Institute Inc. 2014. SAS/IML® 13.2 User's Guide. Cary, NC: SAS Institute Inc., Aug. 2014.
J. Gallier, Curves and Surfaces in Geometric Modeling Theory and Algorithms, Nov. 7, 2015.
H. J. Bierens, Information Criteria and Model Selection, Mar. 12, 2006.
Lehman et al., Chapter 7: t-Tests: Independent Samples and Paired Samples, JMP® for Basic Univaraite and Multivariate Statistics Methods for Researchers and Social Scientists, Second Edition, Apr. 2013.
A.E. Raftery, A Note on Bayes Factors for Log-Linear Contingency Table Models with Vague Prior Information, Journal of the Royal Statistical Society. Series B (Methodological), vol. 48, No. 2, 1986, pp. 249-250.
He et al., A Data-Adaptive Knot Selection Scheme for Fitting Splines, IEEE Signal Processing Letters 8(5), May 2001, pp. 137-139.

* cited by examiner

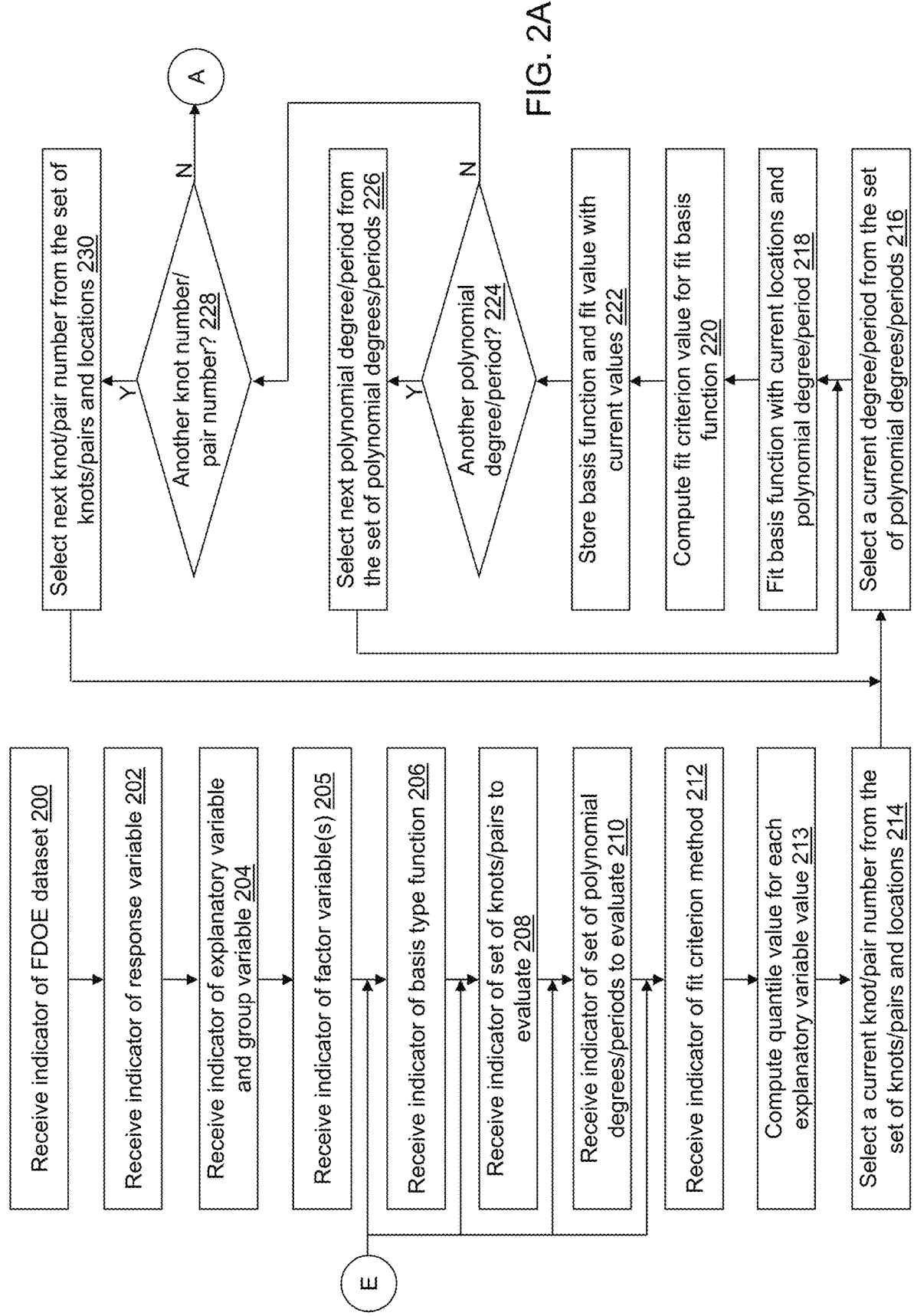

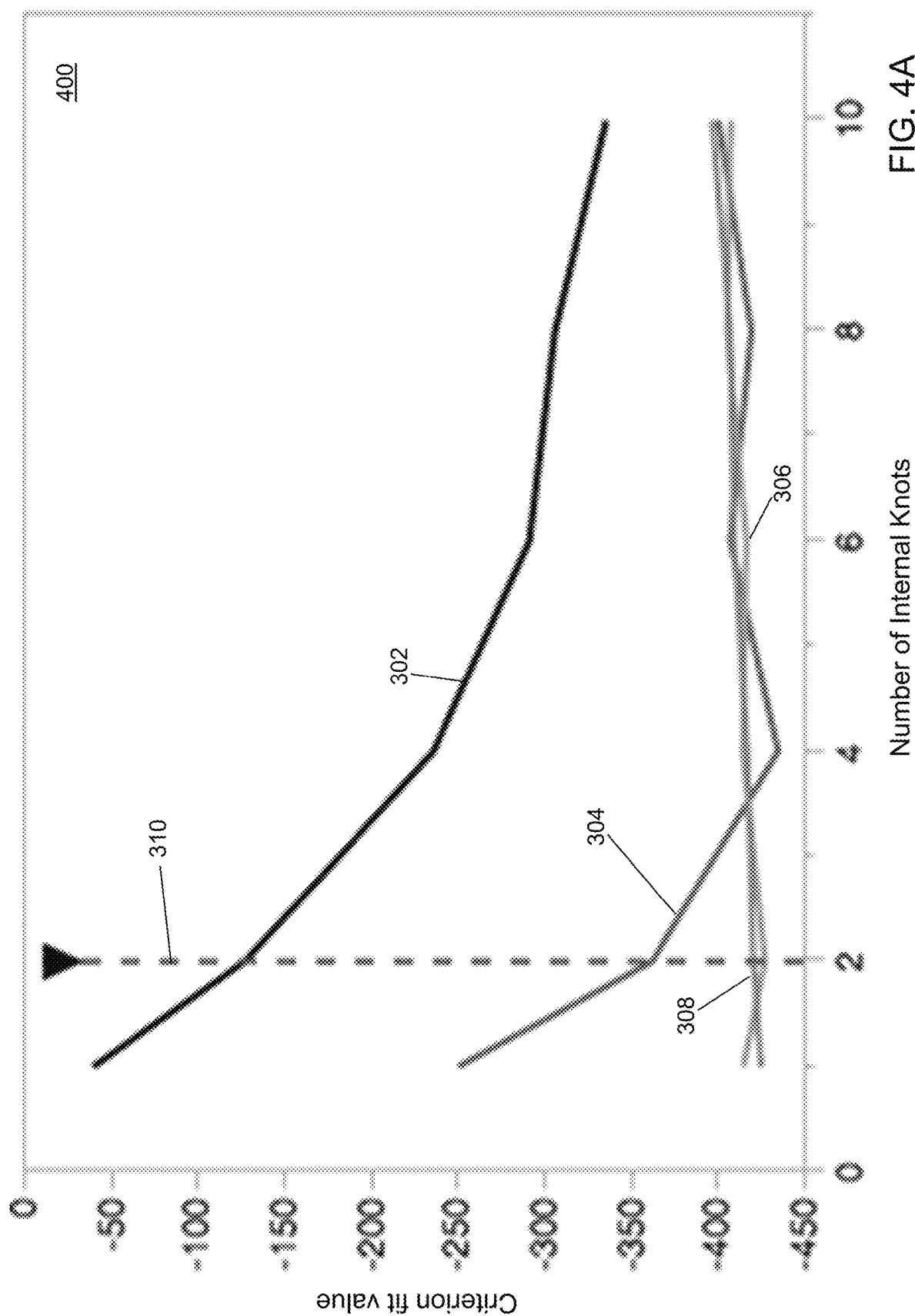

US 10,963,788 B1

ANALYTIC SYSTEM FOR INTERACTIVE GRAPHICAL MODEL SELECTION

CROSS-REFERENCE TO RELATED APPLICATIONS

The present application claims the benefit of 35 U.S.C. § 119(e) to U.S. Provisional Patent Application No. 62/944,110 filed on Dec. 5, 2019, the entire contents of which are hereby incorporated by reference. The present application also claims the benefit of 35 U.S.C. § 119(e) to U.S. Provisional Patent Application No. 62/964,906 filed on Jan. 23, 2020, the entire contents of which are hereby incorporated by reference.

SUMMARY

In an example embodiment, a non-transitory computer-readable medium is provided having stored thereon computer-readable instructions that, when executed by a computing device, cause the computing device to provide interactive model selection. A dataset that includes a plurality of observation vectors defined for each value of a plurality of values of a group variable is read. Each observation vector of each plurality of observation vectors includes an explanatory variable value of an explanatory variable and a response variable value of a response variable. (A) A basis function is fit to each plurality of observation vectors defined for each value of the plurality of values of the group variable to generate basis results. The basis function is fit to the explanatory variable value and the response variable value of each observation vector of each plurality of observation vectors to define coefficients that describe the response variable based on the explanatory variable. (B) The generated basis results from the basis function fit to each plurality of observation vectors are presented within a first sub-window of a first window of a display. (C) A functional principal component analysis (FPCA) is automatically performed on each basis function fit to each plurality of observation vectors to generate FPCA results. (D) The generated FPCA results from the performed FPCA are presented within a second sub-window of the first window of the display. The FPCA results include an eigenvalue and an eigenfunction associated with the eigenvalue for each functional principal component identified from the performed FPCA. (E) An indicator of a request to perform functional analysis using the FPCA results and the dataset based on a predefined factor variable is received. The indicator is received in association with the first window of the display. Each observation vector of each plurality of observation vectors further includes a factor variable value of the predefined factor variable. (F) A model is trained using the eigenvalue and the eigenfunction computed as a result of the performed FPCA for each plurality of observation vectors using the factor variable value associated with each observation vector of each plurality of observation vectors as a model effect. (G) Trained model results are presented from the trained model within a third sub-window of the first window of the display.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide interactive model selection.

In yet another example embodiment, a method of interactive model selection is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, and 2C depict a flow diagram illustrating examples of operations performed by a model selection application of the model selection device of FIG. 1 in accordance with an illustrative embodiment.

FIGS. 3A, 3B, 4A, 4B, 5A, 5B, 6, 7A to 7E, and 8A to 8G show a user interface supported by the model selection application of FIGS. 2A, 2B, and 2C and used to interactively select a model in accordance with an illustrative embodiment.

DETAILED DESCRIPTION

Figure 1:
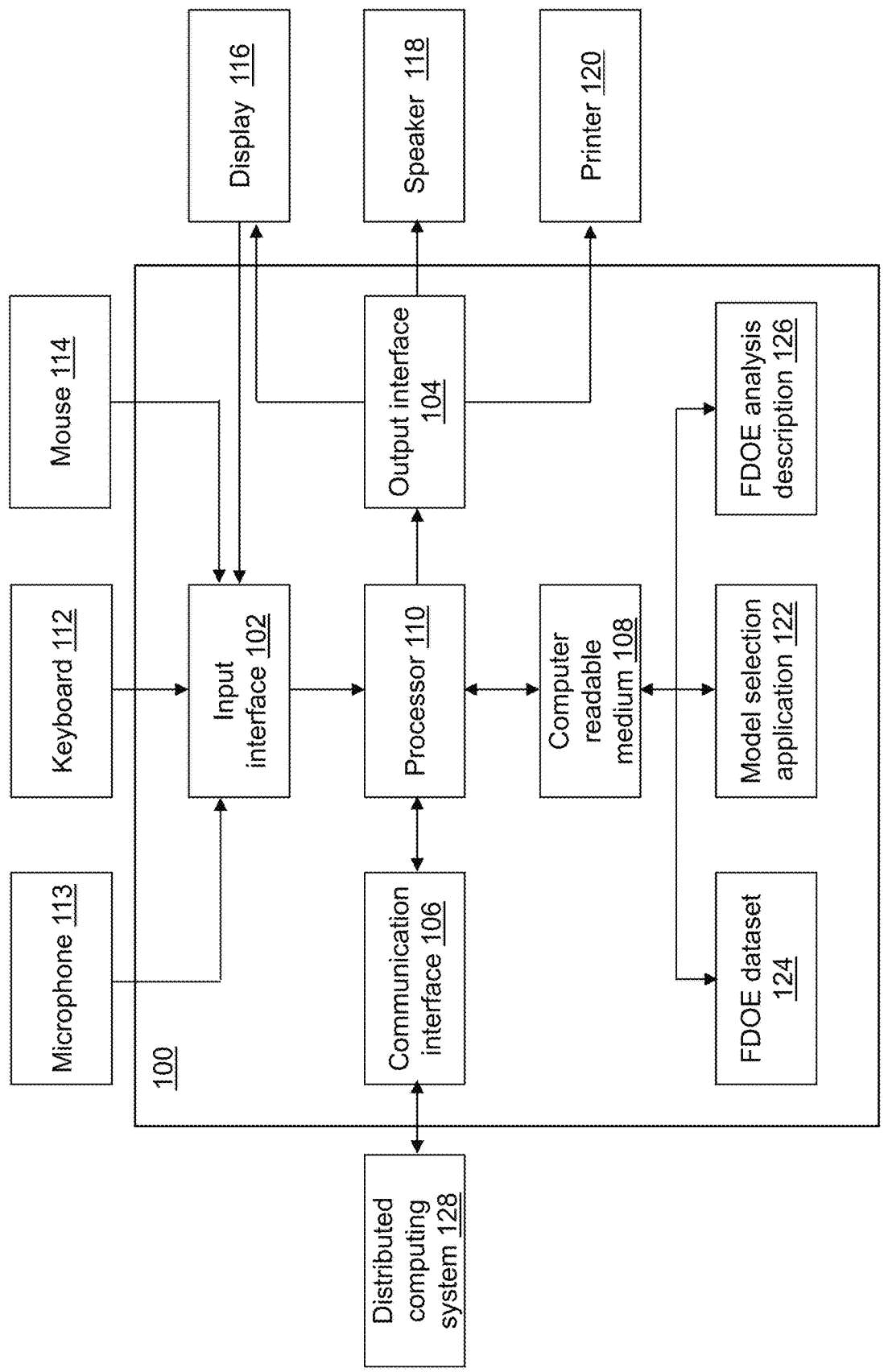
FIG. 1 depicts a block diagram of a model selection device in accordance with an illustrative embodiment.

Referring to FIG. 1, a block diagram of a model selection device 100 is shown in accordance with an illustrative embodiment. Model selection device 100 provides interactive streamlined model selection based on analysis of functional design of experiments (FDOE) data. Model selection device 100 may include an input interface 102, an output interface 104, a communication interface 106, a non-transitory computer-readable medium 108, a processor 110, a model selection application 122, a FDOE dataset 124, and a FDOE analysis description 126. Model selection application 122 provides an interactive and intuitive graphical user interface for users to directly build models that allow them to identify how the data stored in FDOE dataset 124 may impact a functional response. The analytic and model information may be stored in FDOE analysis description 126 for use as a trained model to predict new responses and/or to identify relevant variables for training a model to predict new responses. Fewer, different, and/or additional components may be incorporated into model selection device 100.

A goal of DOE is to describe and explain a variation of information under conditions hypothesized to reflect a variation in one or more dependent variables, also referred to as output variables or response variables, based on one or more independent variables, also referred to as input variables or explanatory variables. The one or more independent variables associated with the one or more dependent variables may further be associated with a group variable that may be defined based on each unique experiment. Using the group variable, the variation associated with the one or more independent variables associated with the one or more dependent variables captures a behavior under one or more experimental conditions. One or more factor variables further may be evaluated as part of the model selection to determine their relationship to the one or more dependent variables. The one or more factor variables may be observed during each experiment. In addition, it is not required that the data come from a pre-designed experiment. FDOE dataset 124 can also come from an observational study that similarly involves one or more independent variables to be associated with one or more dependent variables.

Model selection application 122 performs operations associated with defining FDOE analysis description 126 from data stored in FDOE dataset 124 and with allowing the user of model selection device 100 to interactively select the model input parameters, also referred to as hyperparameters, based on information presented in display 116. FDOE analysis description 126 may be used to predict a response variable value for data stored in an input dataset 924 (shown referring to FIG. 9) based on a relationship identified between the one or more response variables as a function of the one or more explanatory variables. In the alternative or in addition, FDOE analysis description 126 may be used to indicate one or more variables selected from the one or more explanatory variables and/or the one or more factor variables that are useful in training another predictive model to predict a response variable value for data stored in a training dataset 1124 (shown referring to FIG. 11).

Model selection application 122 is easy to use and provides approximately instantaneous feedback so that the user can quickly and efficiently adjust model parameters. Alternative solutions require the user to store data generated as one part of the analysis for input to another process to perform another part of the analysis, while model selection application 122 allows the user to easily change all or any subset of the data analysis or model design parameters as needed to effectively explore, understand, and model the data stored in FDOE dataset 124.

Input interface 102 provides an interface for receiving information from the user or another device for entry into model selection device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model selection device 100 or to make selections presented in a user interface displayed on display 116.

The same interface may support both input interface 102 and output interface 104. For example, display 116 comprising a touch screen provides a mechanism for user input and for presentation of output to the user. Model selection device 100 may have one or more input interfaces that use the same or a different input interface technology. The input interface technology further may be accessible by model selection device 100 through communication interface 106.

Output interface 104 provides an interface for outputting information for review by a user of model selection device 100 and/or for use by another application or device. For example, output interface 104 may interface with various output technologies including, but not limited to, display 116, a speaker 118, a printer 120, etc. Model selection device 100 may have one or more output interfaces that use the same or a different output interface technology. The output interface technology further may be accessible by model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model selection device 100 may have one or more communication interfaces that use the same or a different communication interface technology. For example, model selection device 100 may support communication using an Ethernet port, a Bluetooth antenna, a telephone jack, a USB port, etc. Data and messages may be transferred between model selection device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model selection device 100 also may have one or more drives that support the loading of a memory media such as a CD, DVD, an external hard drive, etc. One or more external hard drives further may be connected to model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model selection device 100 may include a plurality of processors that use the same or a different processing technology.

Some or all of the operations described herein may be embodied in model selection application 122. The operations may be implemented using hardware, firmware, software, or any combination of these methods. Referring to the example embodiment of FIG. 1, model selection application 122 is implemented in software (comprised of computer-readable and/or computer-executable instructions) stored in computer-readable medium 108 and accessible by processor 110 for execution of the instructions that embody the operations of model selection application 122. Model selection application 122 may be written using one or more programming languages, assembly languages, scripting languages, etc.

Model selection application 122 may be integrated with other analytic tools. As an example, model selection application 122 may be part of an integrated data analytics software application and/or software architecture such as that offered by SAS Institute Inc. of Cary, N.C., USA. For example, model selection application 122 may be integrated with a prediction application 922 (shown referring to FIG. 9) and/or a with a model training application 1122 (shown referring to FIG. 11). Merely for illustration, model selection application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Model selection application 122 may be implemented as a Web application. For example, model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

FDOE dataset 124 may include, for example, a plurality of rows and a plurality of columns. The plurality of rows may be referred to as observation vectors or records (observations), and the columns may be referred to as variables. In an alternative embodiment, FDOE dataset 124 may be transposed. The plurality of variables may include a response variable Y and one or more explanatory variables that define an explanatory vector X for each observation vector.

FDOE dataset 124 may include additional variables that are not the response variable Y or one of the explanatory variables included in explanatory vector X. For example, FDOE dataset 124 may include a group variable g that separately identifies each experiment as well as one or more factor variables f. Based on this, an observation vector may be defined as $(y_i, X_i, g_i, f_i)$ that may include a value for each of the response variable Y, the one or more explanatory variables of explanatory vector X, the group variable g, and the one or more factor variables f associated with an $i^{th}$ observation vector i. One or more variables of the plurality of variables may describe a characteristic of a physical object. For example, if FDOE dataset 124 includes data related to operation of a vehicle, the variables may include an oil pressure, a speed, a gear indicator, a gas tank level, a tire pressure for each tire, an engine temperature, a radiator level, etc.

FDOE dataset 124 may include data captured as a function of time for one or more physical objects. The data stored in FDOE dataset 124 may be generated by and/or captured from a variety of sources including one or more sensors of the same or different type, one or more computing devices, etc. Data stored in FDOE dataset 124 may be sensor measurements or signal values captured by a sensor, may be generated or captured in response to occurrence of an event or a transaction, generated by a device such as in response to an interaction by a user with the device, etc. For example, in data science, engineering, and statistical applications, data often consists of multiple measurements (across sensors, characteristics, responses, etc.) collected across multiple time instances (patients, test subjects, experiments, geographic locations, etc.). These measurements may be collected in FDOE dataset 124 for analysis and processing. The data stored in FDOE dataset 124 may be captured at different time points periodically, intermittently, when an event occurs, etc. One or more columns of FDOE dataset 124 may include a time and/or a date value.

The data stored in FDOE dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA.

FDOE dataset 124 may include data captured at a high data rate such as 200 or more observation vectors per second for one or more physical objects of the same or different type. For example, data stored in FDOE dataset 124 may be generated as part of the Internet of Things (IoT), where things (e.g., machines, devices, phones, sensors) can be connected to networks and the data from these things collected and processed within the things and/or external to the things before being stored in FDOE dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in FDOE dataset 124.

The data stored in FDOE dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

FDOE dataset 124 may be stored using various data structures as known to those skilled in the art including one or more files of a file system, a relational database, one or more tables of a system of tables, a structured query language database, a SAS® dataset, etc. on model selection device 100 or on distributed computing system 128. The data may be organized using delimited fields, such as comma or space separated fields, fixed width fields, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

FDOE dataset 124 may be stored on computer-readable medium 108 or on one or more computer-readable media of distributed computing system 128 and accessed by model selection device 100 using communication interface 106, input interface 102, and/or output interface 104. Model selection device 100 may coordinate access to FDOE dataset 124 that is distributed across distributed computing system 128 that may include one or more computing devices. For example, FDOE dataset 124 may be stored in a cube distributed across a grid of computers as understood by a person of skill in the art. As another example, FDOE dataset 124 may be stored in a multi-node Hadoop® cluster. For instance, Apache™ Hadoop® is an open-source software framework for distributed computing supported by the Apache Software Foundation. As another example, FDOE dataset 124 may be stored in a cloud of computers and accessed using cloud computing technologies, as understood by a person of skill in the art. The SAS® LASR™ Analytic Server may be used as an analytic platform to enable multiple users to concurrently access data stored in FDOE dataset 124. The SAS® Viya™ open, cloud-ready, in-memory architecture also may be used as an analytic platform to enable multiple users to concurrently access data stored in FDOE dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Figure 2B:
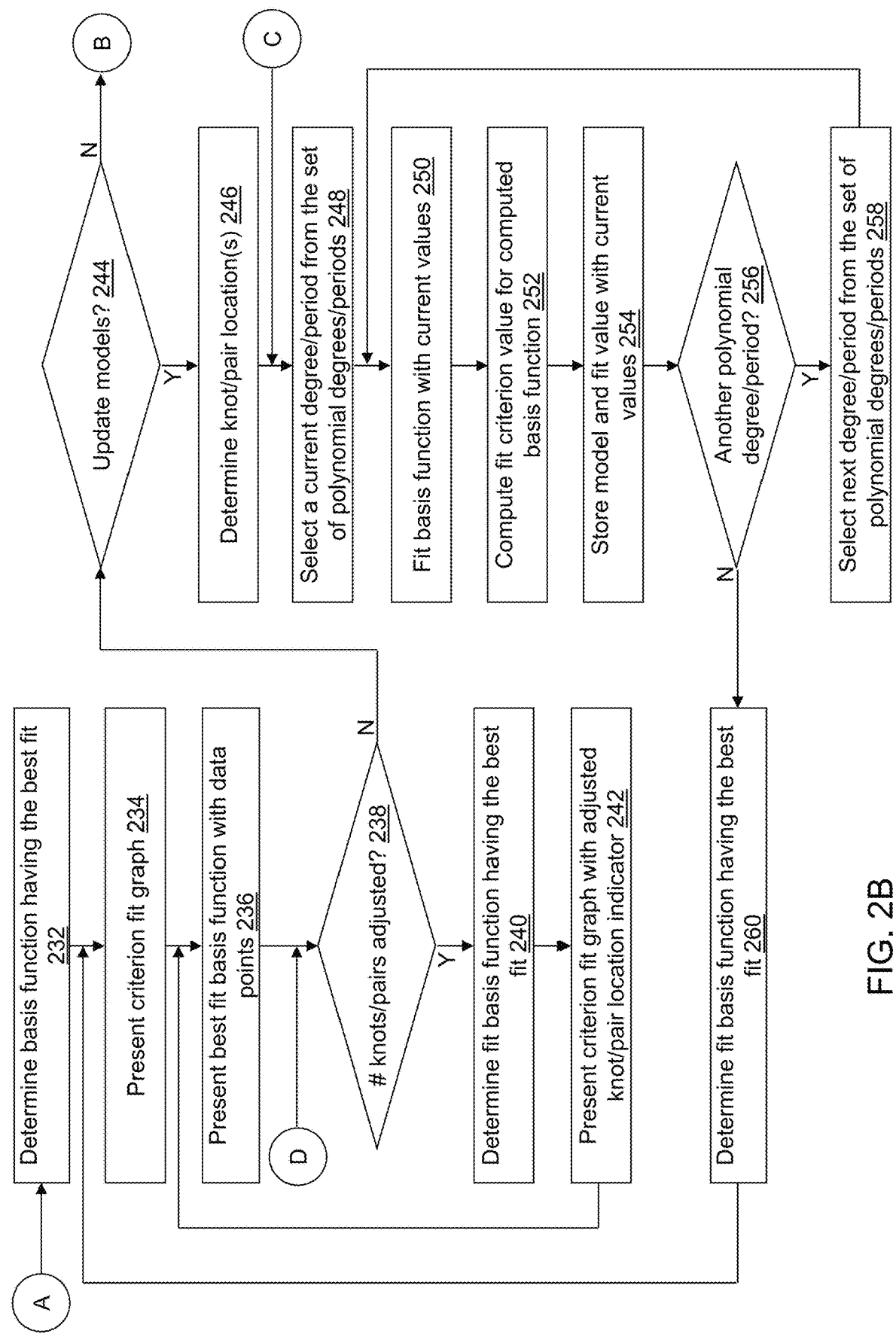
Figure 2C:
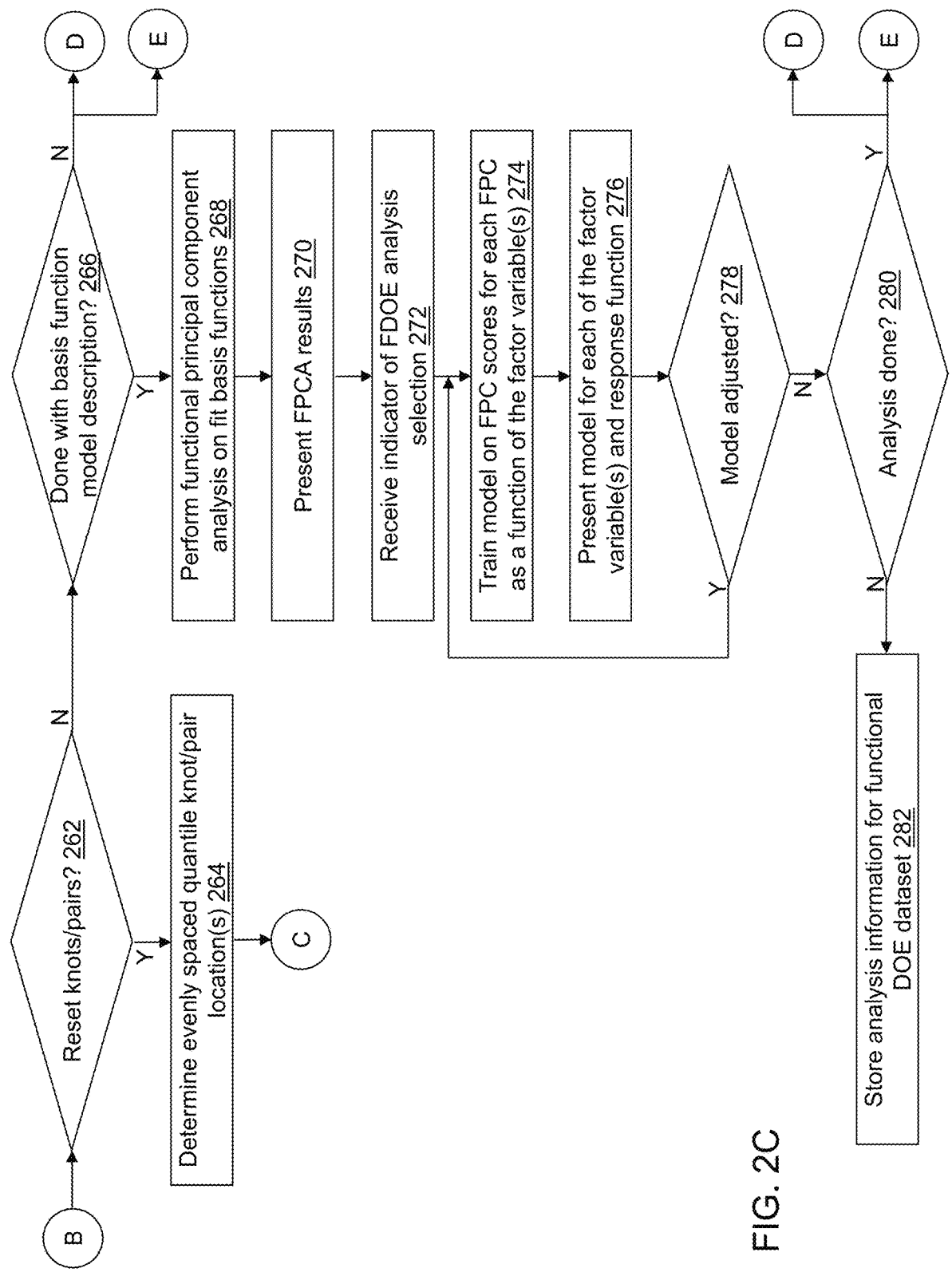
Figure 3A:
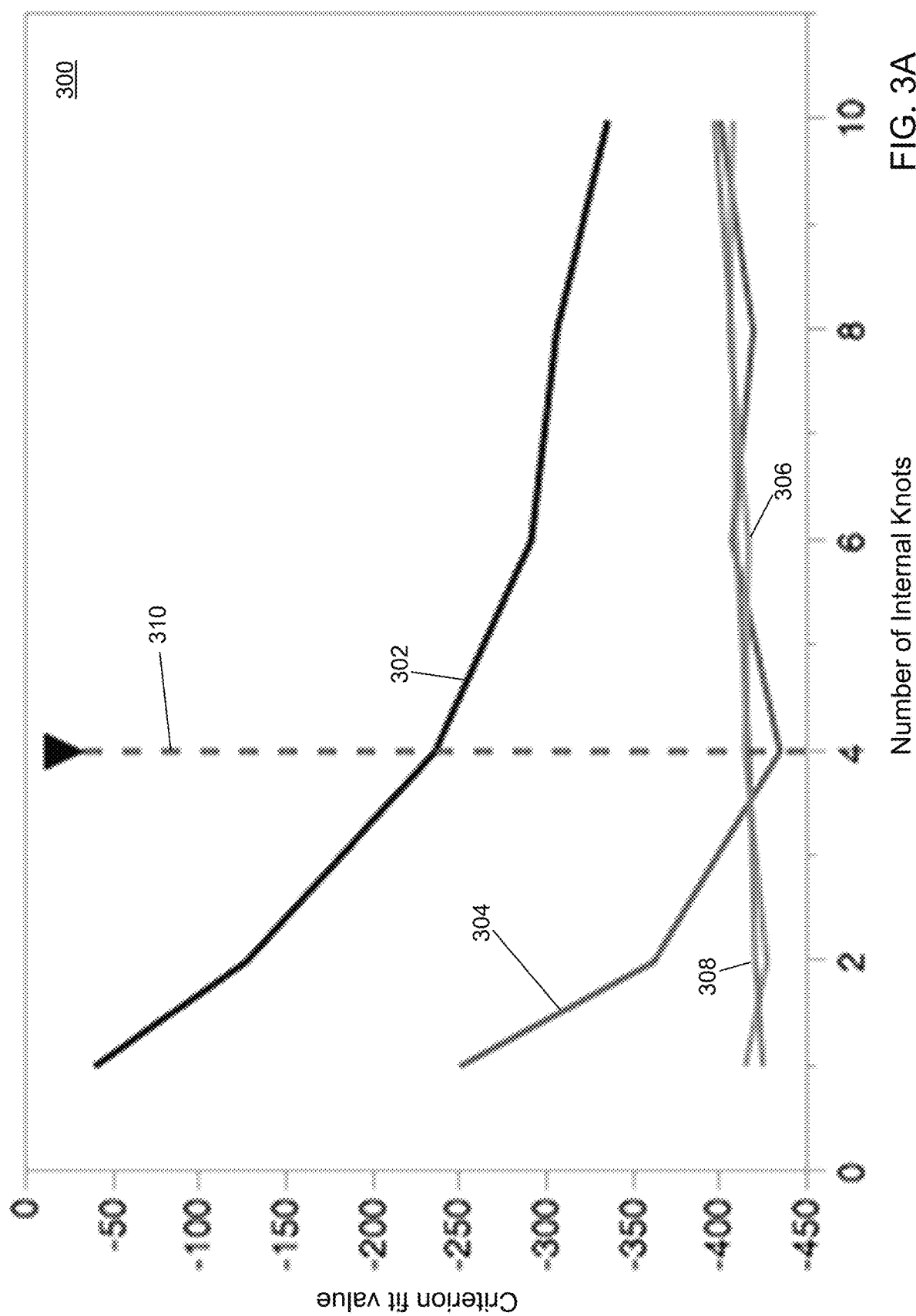
Figure 3B:
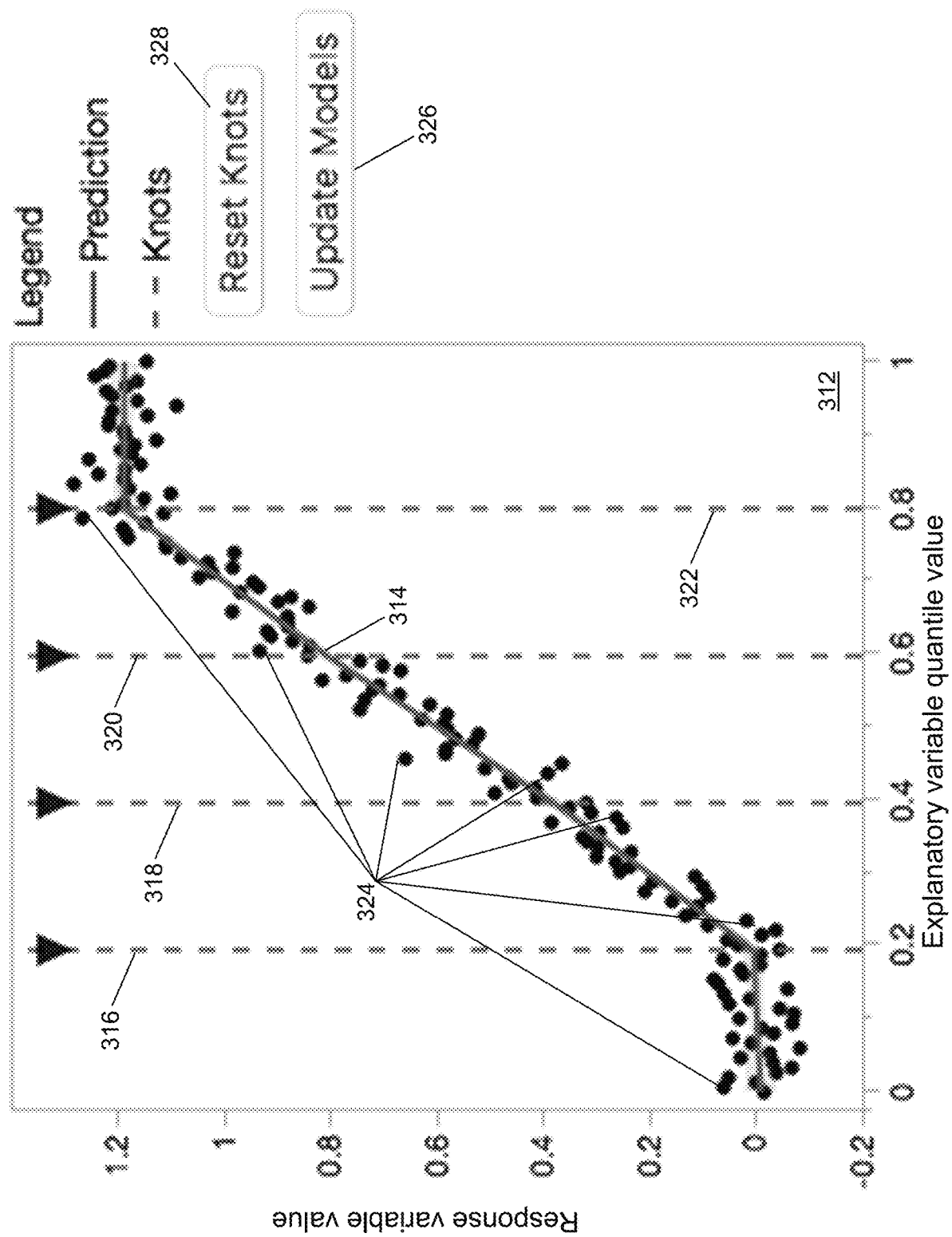
Figure 4B:
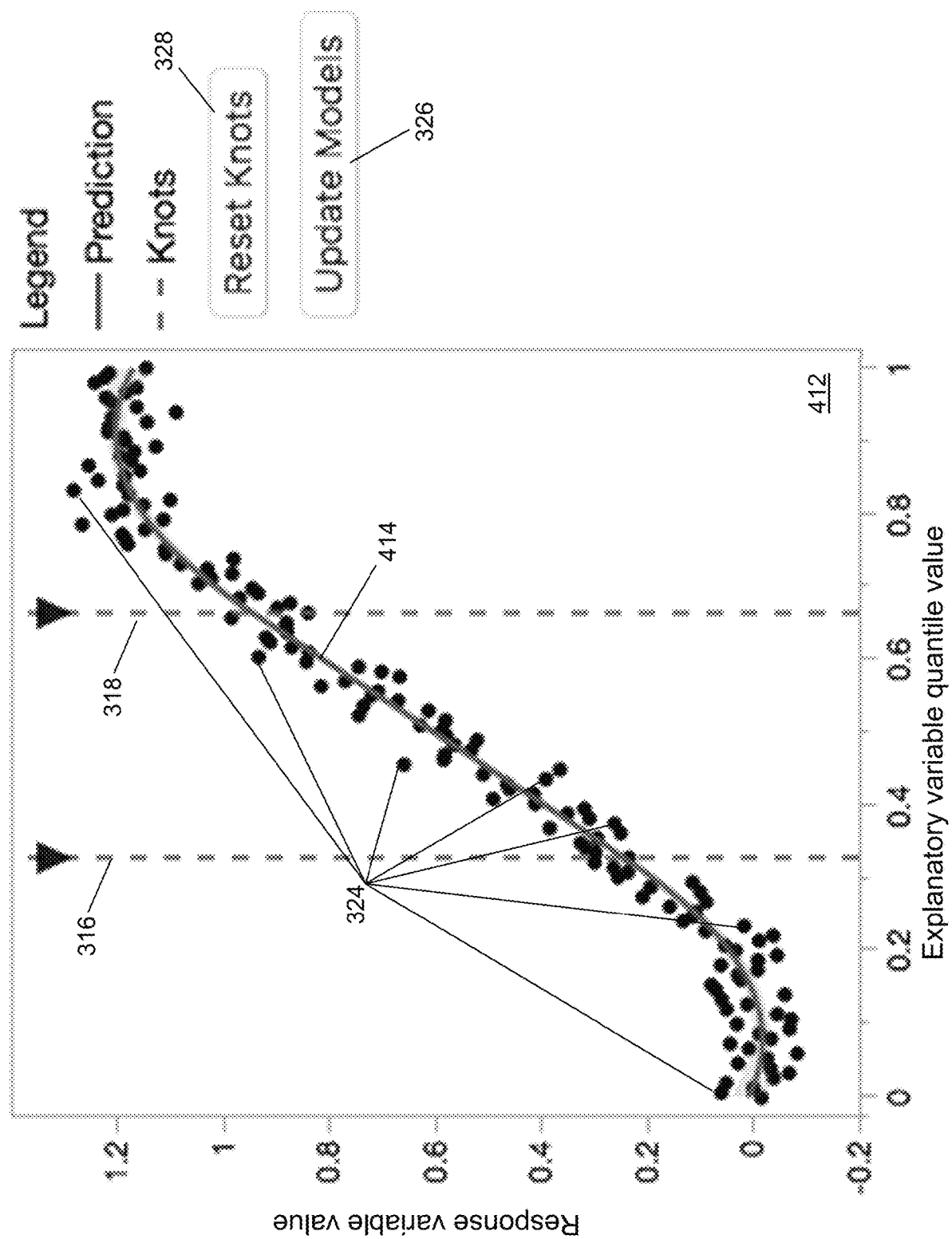

Referring to FIGS. 2A, 2B, and 2C, example operations associated with model selection application 122 are described. Additional, fewer, or different operations may be performed depending on the embodiment of model selection application 122. The order of presentation of the operations of FIGS. 2A, 2B, and 2C is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute model selection application 122, which causes presentation of a first user interface window, which may include a plurality of menus and selectors such as drop-down menus, buttons, text boxes, hyperlinks, etc. associated with model selection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by model selection application 122.

Referring to FIG. 2A, in an operation 200, a first indicator may be received that indicates FDOE dataset 124. For example, the first indicator indicates a location and a name of FDOE dataset 124. As an example, the first indicator may be received by model selection application 122 after selection from a user interface window or after entry by a user into a user interface window. In an alternative embodiment, FDOE dataset 124 may not be selectable. For example, a most recently created dataset may be used automatically.

In an operation 202, a second indicator may be received that indicates response variable Y in FDOE dataset 124. For example, the second indicator may indicate a column number or a column name. As another option, a first or a last column of FDOE dataset 124 may be assumed to be the response variable Y column.

In an operation 204, a third indicator may be received that indicates one or more explanatory variables and group variable g in FDOE dataset 124. For example, the third indicator may indicate a column number or a column name for each of the one or more explanatory variables and a column number or a column name for group variable g. Explanatory vector X may include one or more variable values each of which is associated with a respective explanatory variable.

In an operation 205, a fourth indicator may be received that indicates one or more factor variables f in FDOE dataset 124. For example, the fourth indicator may indicate a column number or a column name for each of the one or more factor variables f.

Figure 6:
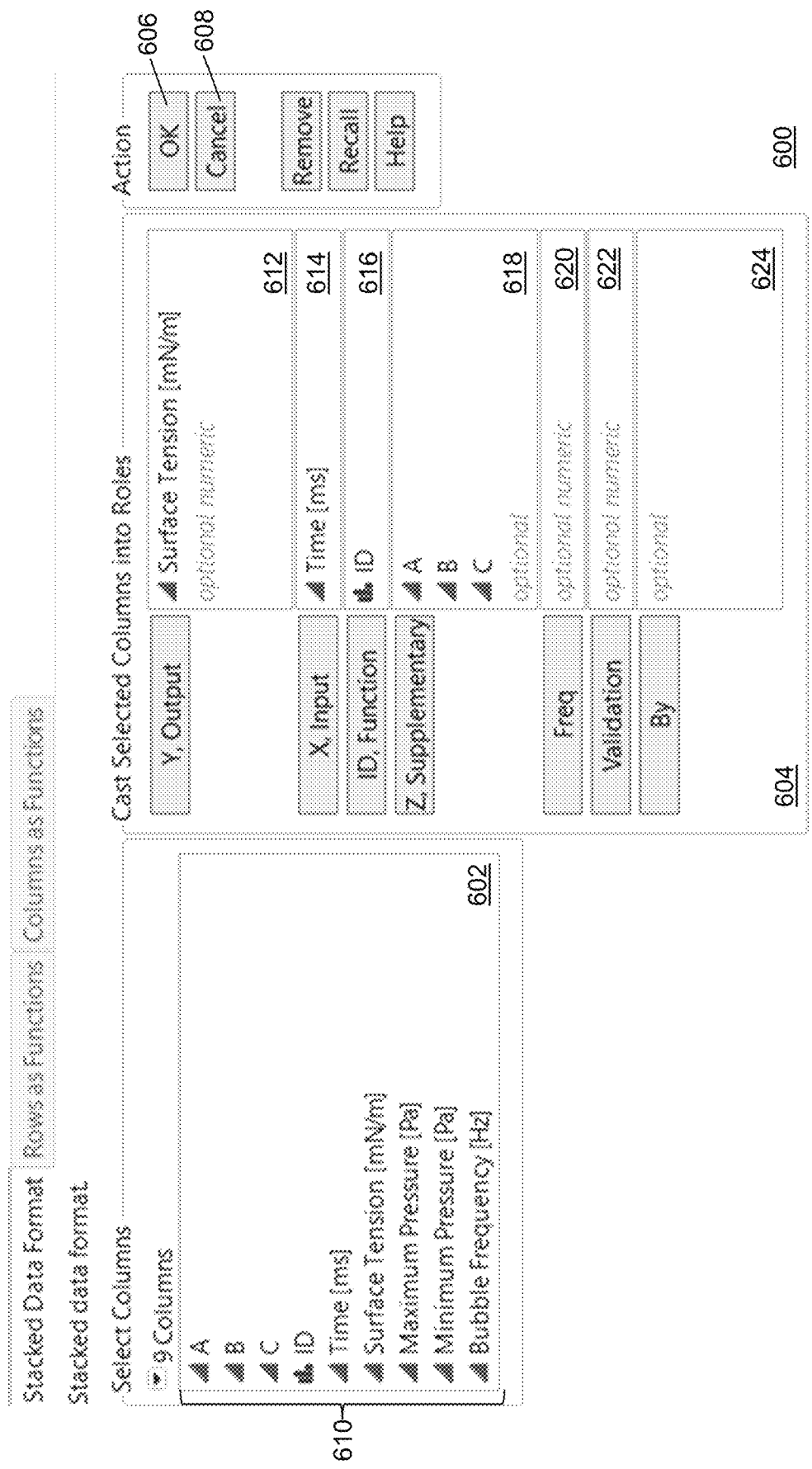

For illustration, referring to FIG. 6, an input window 600 is shown in accordance with an illustrative embodiment. Input window 600 may include a variable list section 602, a role selection section 604, an ok selector 606, and a cancel selector 608. Variable list section 602 may include a list of variables 610 read from FDOE dataset 124 based on a name associated with each column. For example, role selection section 604 of input window 600 can be used to select the one or more response variables Y using a y-variable selector 612, to select explanatory variable X using an x-variable selector 614, to select group variable g using a group variable selector 616, and to select the one or more factor variables f using f-variable selector 618.

In the illustrative embodiment, y-variable selector 612 has been used to define the second indicator as having the column name "Surface Tension [mN/m]", x-variable selector 614 has been used to define the third indicator as having the column name "Time", group variable selector 616 further has been used to define the third indicator as having the column name "ID" for group variable g, and f-variable selector 618 has been used to define the fourth indicator as including three variables associated with column names "A", "B", and "C". Group variable g can be used to identify if there is more than one function in FDOE dataset 124. For example, a distinct function may be defined for each experiment included in FDOE dataset 124.

Role selection section 604 of input window 600 may further include a frequency selector 620, a validation selector 622, and a filter selector 624. Frequency selector 620 indicates a column name of a column whose numeric values assign a frequency to each row in FDOE dataset 124. Validation selector 622 indicates a column name of a column used to indicate whether each row of FDOE dataset 124 is part of a training dataset used in the model fit, or if it is used for validating the model. Filter selector 624 indicates a column name of a column whose levels define separate analyses.

Figure 7A:
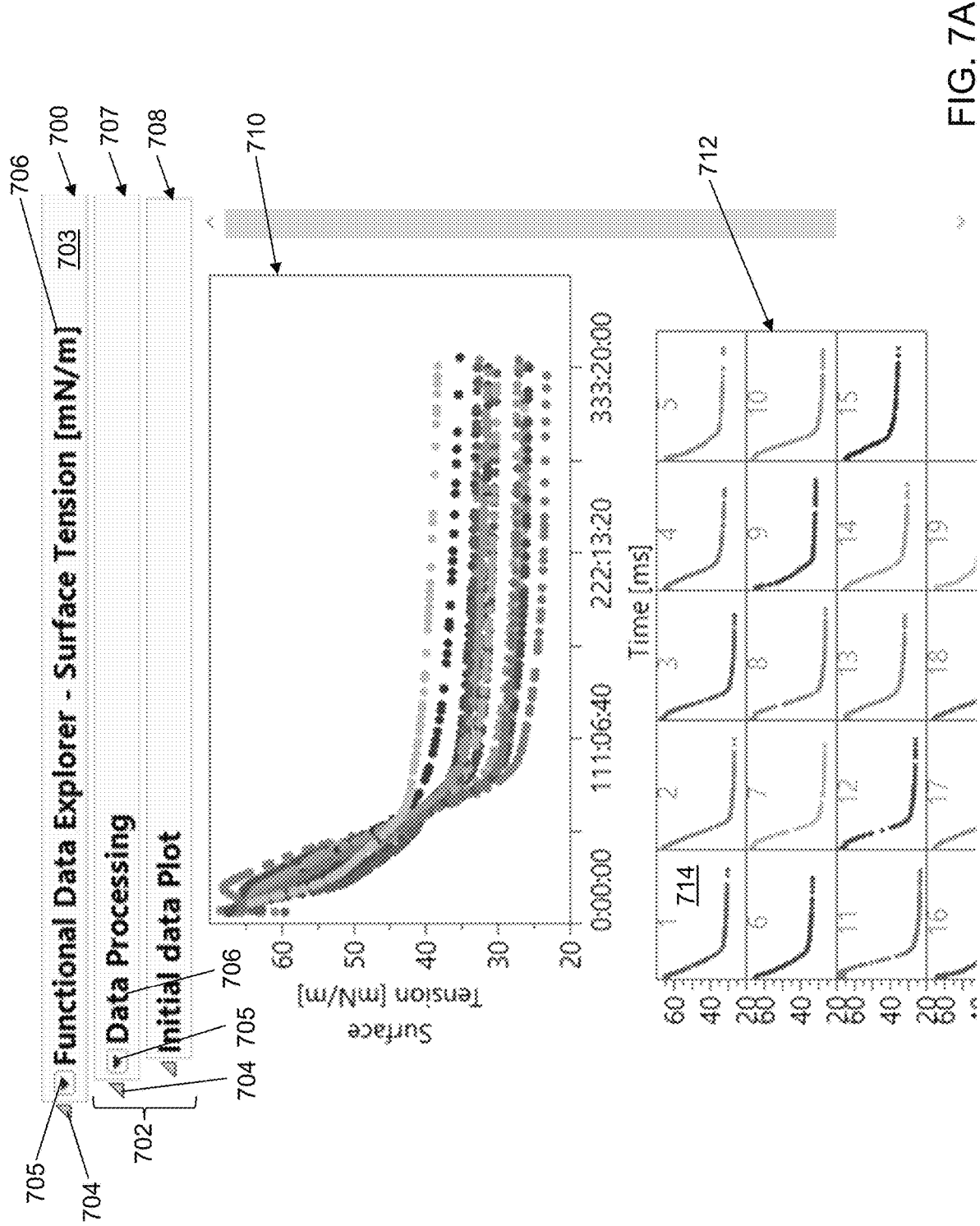

Selection of cancel selector 608 clears any user selection in role selection window 604 and may close or collapse input window 600. Selection of ok selector 606 saves the current user selections in role selection window 604, collapses, and automatically generates a graph of the results. For illustration, referring to FIG. 7A, a data explorer window 700 is shown in accordance with an illustrative embodiment. FIGS. 3A, 3B, 4A, 4B, 5A, 5B, 7A to 7E, and 8A to 8G show data explorer window 700 and various sub-windows of data explorer window 700 in accordance with an illustrative embodiment.

Data explorer window 700 may include a hierarchy of sub-windows 702 that changes as selections are made from selectors presented in data explorer window 700. Data explorer window 700 may include a data explorer header bar 703. The hierarchy of sub-windows 702 descend hierarchically from data explorer header bar 703 because they are associated with a functional data exploration of FDOE dataset 124. Data explorer header bar 703 may include an open/close sub-window selector 704, an open/close menu selector 705, and a header title 706. Successive selection of open/close sub-window selector 704 toggles between opening and closing the hierarchy of sub-windows 702. When toggled closed, open/close sub-window selector 704 may appear as a forward arrow in contrast to the right triangle shown in the illustrative embodiment. Open/close menu selector 705 toggles between showing and not showing a menu of selections associated with data explorer window 700. Text to the right of open/close menu selector 705 defines header title 706 that summarizes a content of data explorer window 700.

Though not labeled for simplicity, each sub-window of data explorer window 700 may include a respective open/close sub-window selector 704, open/close menu selector 705, and header title 706. An indentation level of each sub-window included in the hierarchy of sub-windows 702 may indicate a child and/or sibling relationship between the hierarchy of sub-windows 702 that are all child windows of data explorer window 700. Again, based on selections in open/close menu selector 705 associated with data explorer window 700 and each sub-window of data explorer window 700, the child windows of the hierarchy of sub-windows 702 may change.

Figure 7B:
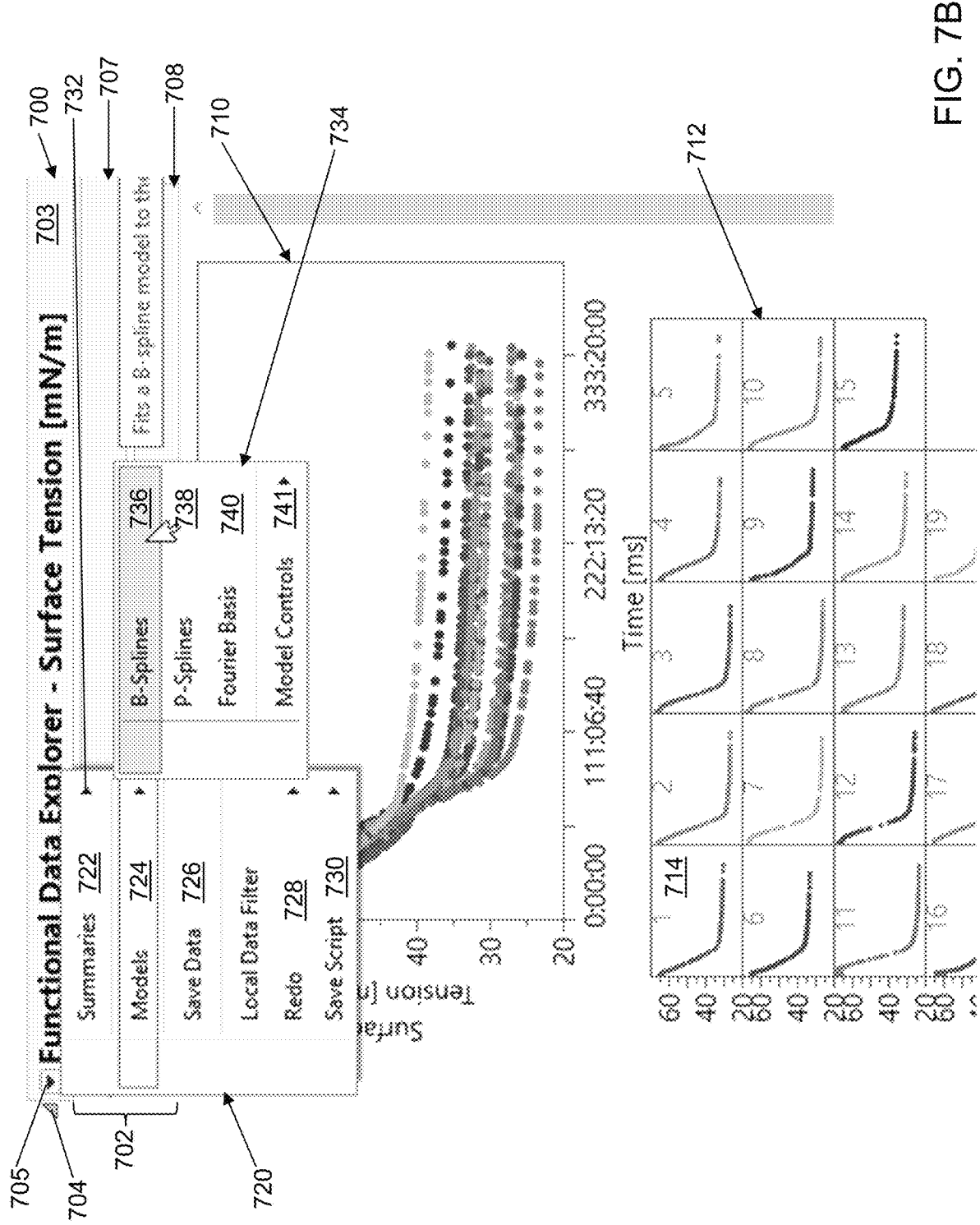
Figure 7C:
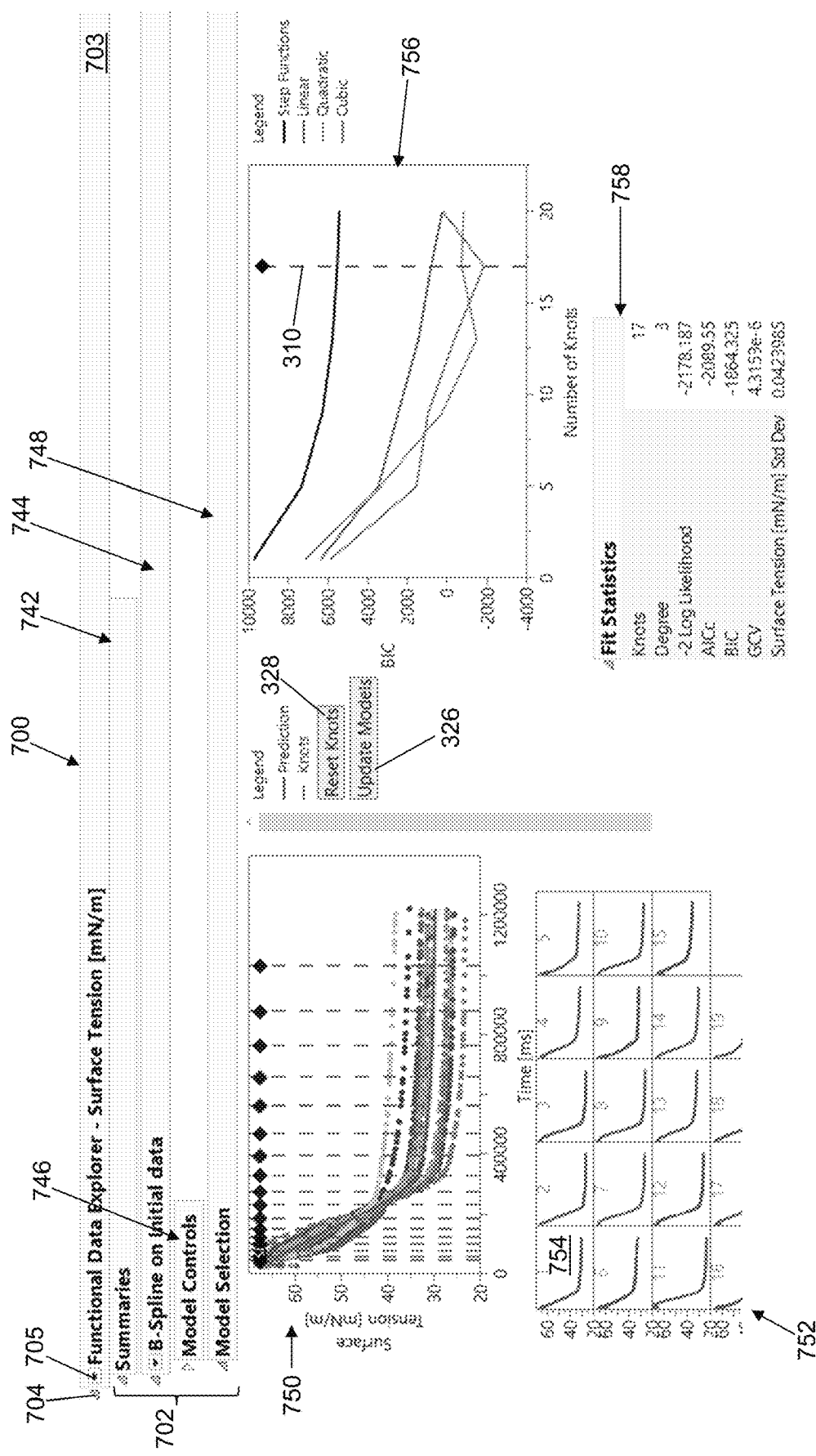
Figure 7D:
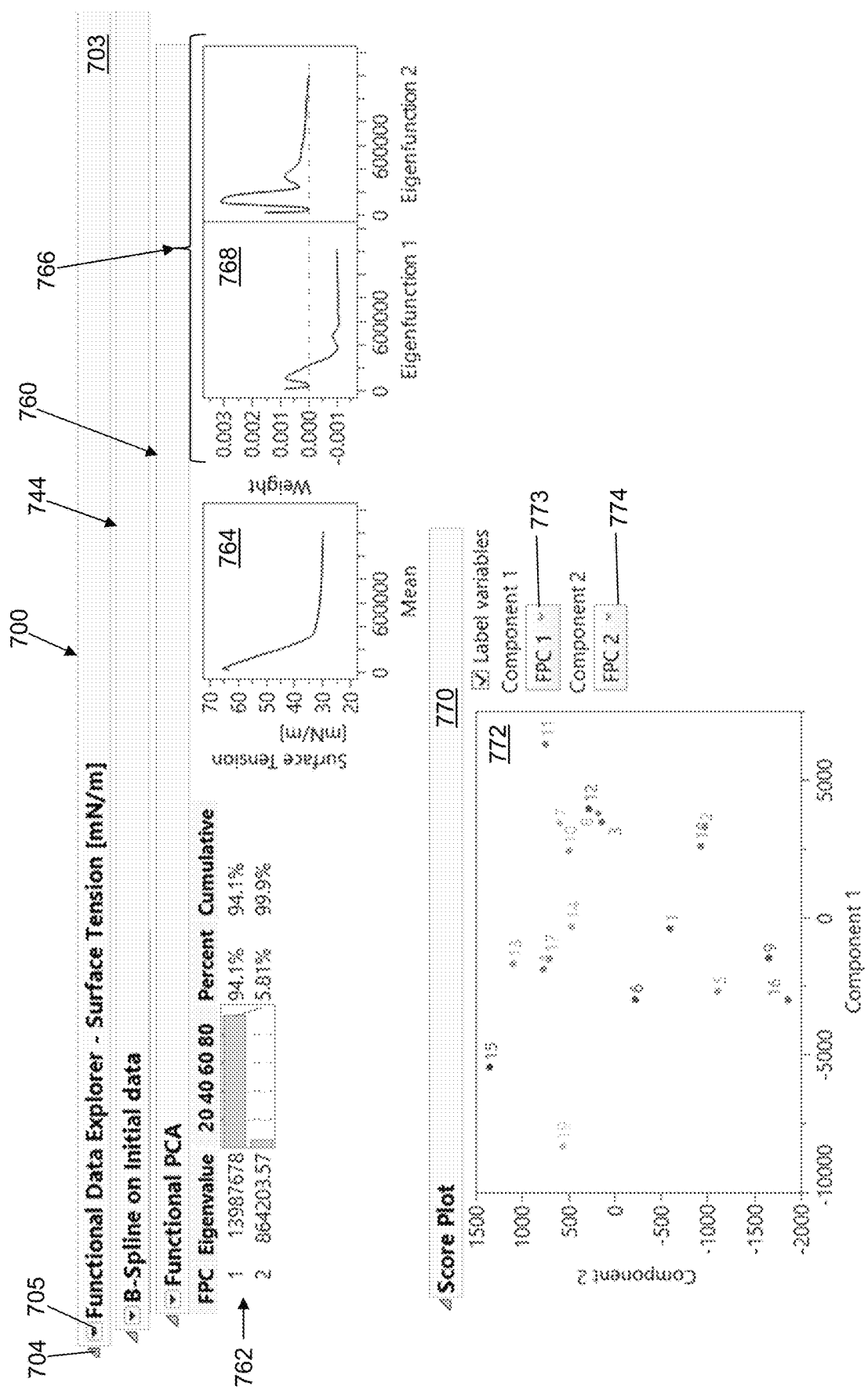
Figure 7E:
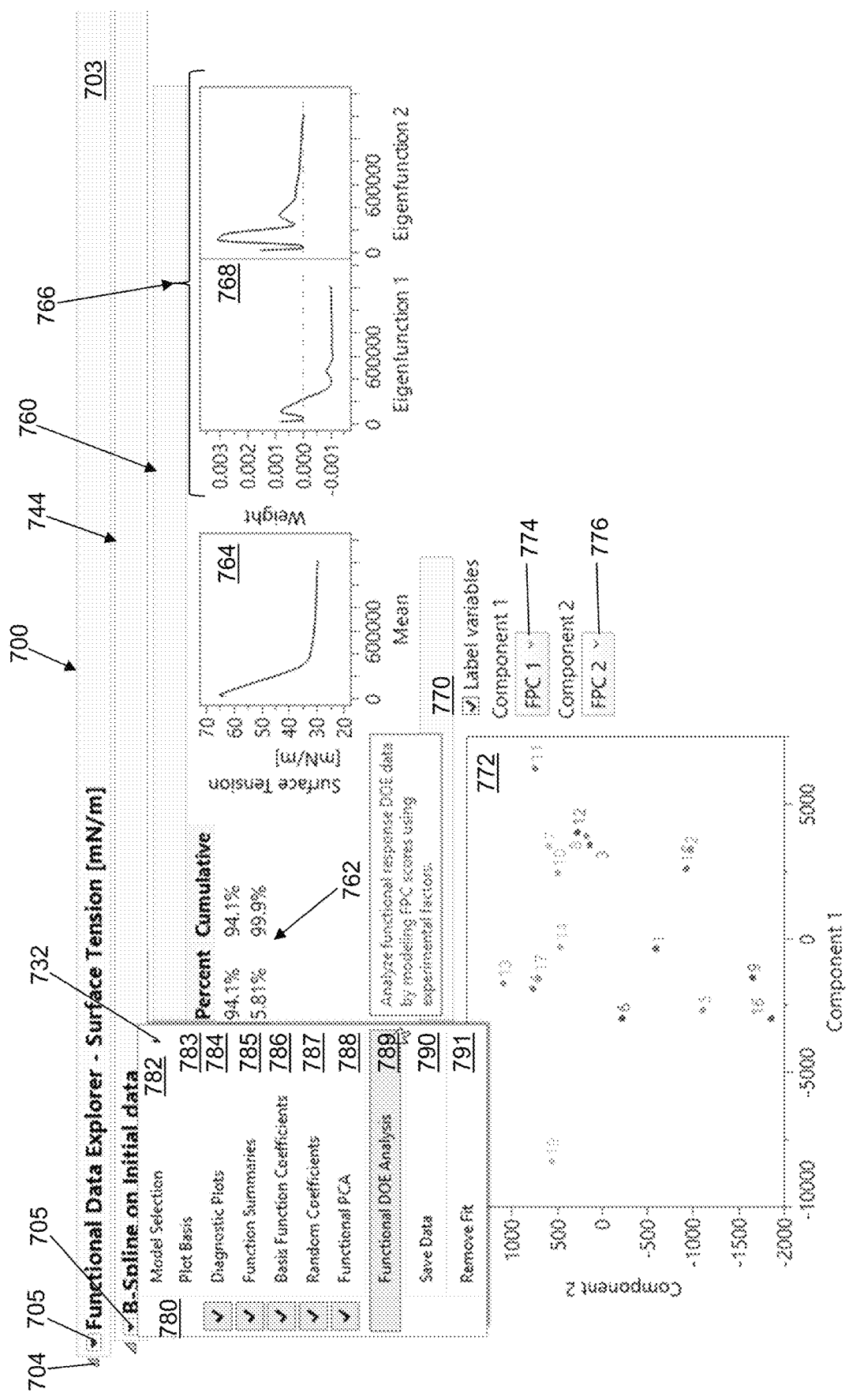

After selection of ok selector 606, the hierarchy of sub-windows 702 may include a data processing sub-window 707 and a summaries sub-window 742 (shown referring to FIG. 7C). Data processing sub-window 707 may include a data plot sub-window 708 that is a child window of data processing sub-window 707. Because data processing sub-window 707 includes a menu of options, data processing sub-window 707 includes open/close sub-window selector 704, open/close menu selector 705, and header title 706.

Data plot sub-window 708 may include a response graph 710 and a plurality of experiment response graphs 712. The plurality of experiment response graphs 712 includes an experiment response graph for each value of the group variable g in FDOE dataset 124 selected using group variable selector 616. For example, a first experiment response graph 714 shows the response graph that results for a first value of the group variable g in FDOE dataset 124. Response graph 710 includes a graph of response variable Y selected using y-variable selector 612 as a function of the explanatory variable X selected using x-variable selector 614. Response graph 710 includes a curve plotted for each value of the group variable g in FDOE dataset 124 selected using group variable selector 616. Each curve may be shown using a different color, symbol, line type, etc. or otherwise labeled to distinguish each value of the group variable g.

Though not shown, summaries sub-window 742 of data explorer window 700 may include overall summary statistics such as a number of observation vectors in FDOE dataset 124, a number of values of the group variable g in FDOE dataset 124, a mean value, a standard deviation value, a minimum value, a maximum values, etc. Summaries sub-window 742 may further include plots of a functional mean and a functional standard deviation computed for each unique value of group variable g.

In an operation 206, a fifth indicator may be received that indicates a basis type function. For example, the fifth indicator indicates a name of a type of basis function. A basis function models a behavior of response variable Y given explanatory variable X. A functional model is created by fitting the indicated type of basis function to the columns of data identified in FDOE dataset 124 using the second through fourth indicators.

The fifth indicator may be received by model selection application 122 after selection from a user interface window or after entry by a user into a user interface window. A default value for the type of basis function may further be stored, for example, in computer-readable medium 108. As an example, a type of basis function may be selected from "B-Splines", "P-Splines", "Fourier Basis", "Wavelets", "Power Basis", "Exponential Basis", etc. For example, a default type of basis function may be indicated by "B-Splines", which indicates a basis spline function. For illustration, "P-Splines" indicates a penalized basis spline function, "Fourier Basis" indicates a Fourier basis function, "Wavelets" indicates a wavelet basis function, "Power Basis" indicates a power basis function that raises the input to a power over a grid of powers, and "Exponential Basis" indicates an exponential basis function. Of course, the type of basis function may be labeled or selected in a variety of different manners by the user as understood by a person of skill in the art. In an alternative embodiment, the type of basis function may not be selectable, and a single type of basis function is implemented by model selection application 122. For example, the type of basis function indicated as "B-Spline" may be used by default or without allowing a selection.

For illustration, a basis function can be computed using the TRANSREG, PRINQUAL, the GLMSELECT procedure, and GLIMMAX procedures implemented by SAS/STAT software described in SAS/Stat® 9.3 User's Guide, using the adaptivereg action implemented by SAS Viya software, or the BSPLINE function of SAS/IML® described in SAS/IML® 13.2 User's Guide, SAS Institute Inc., Cary, N.C. (2014). For example, the paper by Amara Graps titled *An Introduction to Wavelets* published in the IEEE Computational Science & Engineering Journal in 1995 describes implementation of an illustrative "Wavelets" type of basis function. For example, the paper by Movahedian, B. et al.

titled *A Trefftz method in space and time using exponential basis functions: Application to direct and inverse heat conduction problems* published in the Engineering Analysis with Boundary Elements Journal Volume 37 at pages 868 to 883 in 2013 describes implementation of an illustrative "Exponential Basis" type of basis function. For example, the paper by George Konidaris et al. titled *Value Function Approximation in Reinforcement Learning Using the Fourier Basis* published in the Proceedings of the Twenty-Fifth AAAI Conference on Artificial Intelligence at pages 380 to 385 in 2011 describes implementation of an illustrative "Fourier Basis" type of basis function. For example, the paper by Paul H. C. Eilers and Brian D. Marx titled *Flexible Smoothing with B-splines and Penalties* published in Statistical Science Volume 11, No. 2 at pages 89 to 121 in 1996 describes implementation of an illustrative "P-Splines Basis" type of basis function. For example, the paper by Paul H. C. Eilers and Brian D. Marx titled *Flexible Smoothing with B-splines and Penalties* published in Statistical Science Volume 11, No. 2 at pages 89 to 121 in 1996 describes implementation of an illustrative "P-Splines Basis" type of basis function.

For example, referring to FIG. 7B, after selection of open/close menu selector 705 of data explorer window 700, an options menu 720 may be presented in display 116 in accordance with an illustrative embodiment. Options menu 720 may include a summaries selector 722, a models selector 724, a save data selector 726, a redo selector 728, and a save script selector 730. A forward arrow 732 associated with any of the selectors of options menu 720 may indicate that selection of the respective selector results in a sub-menu of options menu 720. Selection of forward arrow 732 of summaries selector 722 presents selectors related to presentation of information related to a summary of the data read from FDOE dataset 124.

Selection of forward arrow 732 of models selector 724 presents selectors related to a basis function selection. For example, selection of forward arrow 732 associated with models selector 724 may result in presentation of a model sub-window 734 that may include a b-splines selector 736, a p-splines selector 738, a Fourier basis selector 740, and a model controls selector 741. A greater or a fewer number of basis models may be included in model sub-window 734 in alternative embodiments. The fifth indicator may be received by model selection application 122 after the user selects one of b-splines selector 736, p-splines selector 738, or Fourier basis selector 740. Selection of any of b-splines selector 736, p-splines selector 738, and Fourier basis selector 740 may result in computation of the associated basis function using default values or other values modified by the user using model controls selector 741.

Selection of save data selector 726 saves processed data read from FDOE dataset 124, for example, to a new data table. For example, though not shown, data read from FDOE dataset 124 may be processed before creating response graph 710 to remove zeroes, delete values, filter values, transform the data, etc. Selection of forward arrow 732 of redo selector 728 presents selectors related to repeating or relaunching an analysis. Selection of forward arrow 732 of save script selector 730 presents selectors related to saving a script that can reproduce response graph 710.

In an operation 208, a sixth indicator of a set of a number of internal knots/pairs to evaluate using the basis function may be received. For example, a minimum number of internal knots/pairs, a maximum number of internal knots/pairs, and a number of internal knots/pairs increment may be selected or defined by the user using model controls selector 741. The number of internal knots may be indicated when the type of basis function is a b-spline or a p-spline. The number of internal pairs may be indicated when the type of basis function is a Fourier basis type to define a number of Fourier sine/cosine pairs. As another option, a user entered list of the number of knots/pairs to evaluate is received. In an alternative embodiment, the fifth indicator may not be received. For example, default values for the set of knots/pairs may be stored, for example, in computer-readable medium 108 and used automatically. For illustration, the set of knots/pairs to evaluate may include $N_{IK}=\{1, 2, 3, \ldots, 10\}$ number of internal knots/pairs that is used by default unless the user selects a different set of values for $N_{IK}$. An "exterior" knot is at an end point, primarily to handle the differences between polynomial degree/periods equal to 0, 1, 2, 3, etc. It is common to select these end points over the range of FDOE dataset 124. This means there are $N_{EK}=D+1$ number of external knots/pairs where D is a polynomial degree/period at the location corresponding to a minimum and to a maximum over the range of FDOE dataset 124. For example, $N_{EK}=4$, for a cubic (D=3) polynomial degree/period. The total number of knots/pairs is then $N_{TK}=2N_{EK}$ $N_{IK}$. The set of knots/pairs includes only the internal knots/pairs. The set of knots/pairs need not be in numerical order. As additional examples, a number of power parameters or center parameters may be indicated when the type of basis function is a wavelets basis type, a number of grids may be indicated when the type of basis function is an exponential basis type, and a number of powers may be indicated when the type of basis function is a power type of basis function.

In an operation 210, a seventh indicator of a set of polynomial degree/periods to evaluate or a set of Fourier series periods to evaluate using the basis function may be received. For example, a minimum polynomial degree/period and a maximum polynomial degree/period may be selected or defined by the user using model controls selector 741. The number of polynomial degree/periods may be indicated when the type of basis function is a spline type. The number of Fourier series periods may be indicated when the type of basis function is a Fourier basis type. In an alternative embodiment, the sixth indicator may not be received. For example, default values for the set of polynomial degree/periods may be stored, for example, in computer-readable medium 108 and used automatically. For illustration, the default set of polynomial degree/periods to evaluate may include $N_D=\{0, 1, 2, 3\}$ when the type of basis function is a spline type unless the user selects a different set of values for $N_D$. For illustration, the default set of periods to evaluate may include $N_D=\{6, 12, 18, 24\}$ when the type of basis function is a Fourier basis unless the user selects a different set of values for $N_D$. The set of polynomial degree/periods need not be in numerical order. As additional examples, a set of mother wavelets may be indicated when the type of basis function is a wavelets basis type, a set of rate values for each grid may be indicated when the type of basis function is an exponential basis type, and a set of values for each power/center may be indicated when the type of basis function is a power type of basis function.

In an operation 212, an eighth indicator may be received that indicates a fit criterion method to use to estimate a quality of or a goodness of a fit of each basis function to paired values of the explanatory variable X and the response variable Y read from FDOE dataset 124 for each value of the group variable g. For example, the eighth indicator indicates a name of a fit criterion method that may be selected by the user using model controls selector 741. The eighth indicator may be received by model selection application 122 after selection from a user interface window or after entry by a user into a user interface window. A default value for the fit criterion method may further be stored, for example, in computer-readable medium 108. As an example, a fit criterion method may be selected from "BIC", "AIC", "GCV", "Robust GCV", "AICc", etc. For example, a default fit criterion method may be indicated by "BIC", which indicates a Bayesian information criterion method, by "AIC", which indicates an Akaike (AIC) information criterion method, by "GCV", which indicates a generalized cross-validation (GCV) information criterion method, by "Robust GCV", which indicates a robust GCV information criterion method, by "AICc", which indicates a corrected AIC information criterion method, etc. Of course, the fit criterion method may be labeled or selected in a variety of different manners by the user as understood by a person of skill in the art. In an alternative embodiment, the fit criterion method may not be selectable, and a single fit criterion method is implemented by model selection application 122. For example, the fit criterion method indicated as "BIC" may be used by default or without allowing a selection.

Selection of forward arrow 732 of model controls selector 741 presents selector(s) related to defining parameters associated with any of the models including the fit criterion method. For example, when a b-spline or p-spline model is to be fit, a number of knots and a spline degree or ranges can be defined, and when a Fourier basis model is to be fit, a number of Fourier pairs and a period or ranges can be defined.

In an operation 213, a quantile value is computed for each explanatory variable value read from FDOE dataset 124 based on each value of the group variable g. For example, a first set of quantile values is computed for a first value of the group variable g, a second set of quantile values is computed for a second value of the group variable g, and so on. For illustration, the RANK procedure implemented by Base SAS software can be used to compute the quantile values. For example, by specifying a GROUPS=100 option, percentile rank values can be computed for each explanatory variable value read from FDOE dataset 124. In an alternative embodiment, the quantile value may not be computed. For example, when the "Fourier Basis" type of basis function is selected, operation 213 is not performed. Instead, a number of unique values of the explanatory variable X in FDOE dataset 124 is determined and used instead of the quantile value.

In an operation 214, a current number of knots/pairs $N_{CK}$ is selected from the set of knots/pairs $N_{IK}$. Again, the current number of knots/pairs $N_{CK}$ is a number of internal knots. For example, a first number of knots/pairs is selected from the set of knots/pairs $N_{IK}$. For example, the internal knot locations are chosen by selecting knots located at evenly spaced quantiles of the explanatory variable values read from FDOE dataset 124 based on the current number of knots/pairs $N_{CK}$, where a first external knot location is also defined at quantile level zero and a last external knot location is also defined at quantile level one. A first external knot associated with the first external knot location and a last external knot associated with the last external knot location are not included in the current number of knots $N_{CK}$. In an alternative embodiment, evenly spaced values for each explanatory variable value read from FDOE dataset 124 are used to define the knot locations. When the "Fourier Basis" type of basis function is selected, evenly spaced values of the number of unique values of the explanatory variable X are used to define the pair locations based on the current number of knots/pairs $N_{CK}$.

In an operation 216, a current polynomial degree/period $N_{CD}$ is selected from the set of polynomial degree/periods $N_D$. For example, a first polynomial degree/period is selected from the set of polynomial degree/periods $N_D$.

In an operation 218, a basis function is fit to the pairs of the response variable value and either the quantile value computed for each explanatory variable value of each observation vector read from FDOE dataset 124 or the value of each explanatory variable value of each observation vector read from FDOE dataset 124 using the current number of knots/pairs $N_{CK}$ and the current polynomial degree/period $N_{CD}$ and based on the type of basis function indicated in operation 206. The basis function is further separately fit for each value of the group variable g. B-splines and p-splines are piecewise polynomials defined based on the current polynomial degree/period $N_{CD}$ and are continuous at each internal knot location except when $N_{CD}$=0. A Fourier basis function generates periodic Fourier series expansions that are continuous at each internal pair location except when $N_{CD}$=0. An average fit basis function is computed from the basis function fit for each value of the group variable g.

In an operation 220, a criterion fit value is computed for the fit basis function for each value of the group variable g and for the average fit basis function based on the fit criterion method selected in operation 212.

In an operation 222, coefficients that describe the fit basis function and the computed criterion fit value may be stored in computer-readable medium 108 in association with the current number of knots/pairs $N_{CK}$, the current polynomial degree/period $N_{CD}$, the value of group variable g, and/or an indicator of the average fit basis function.

In an operation 224, a determination is made concerning whether there is another polynomial degree/period of the set of polynomial degree/periods to evaluate. When there is another polynomial degree/period, processing continues in an operation 226. When there is not another polynomial degree/period, processing continues in an operation 228. For example, a polynomial degree/period counter may be used to index into the set of polynomial degree/periods, and a value of the polynomial degree/period counter may be used to indicate whether there is another polynomial degree/period of the set of polynomial degree/periods to evaluate.

In operation 226, a next polynomial degree/period is selected from the set of polynomial degree/periods $N_D$ as the current polynomial degree/period $N_{CD}$, and processing continues in operation 218 to fit the basis function using the next polynomial degree/period.

In operation 228, a determination is made concerning whether there is another number of knots/pairs of the set of knots/pairs $N_{IK}$ to evaluate. When there is another number of knots/pairs, processing continues in an operation 230. When there is not another number of knots/pairs, processing continues in an operation 232. For example, a number of knots/pairs counter may be used to index into the set of knots/pairs $N_{IK}$, and a value of the number of knots/pairs counter may be used to indicate whether there is another number of knots/pairs of the set of knots/pairs $N_{IK}$ to evaluate.

In operation 230, a next number of knots/pairs is selected from the set of knots/pairs $N_{IK}$ as the current number of knots/pairs $N_{CK}$, and processing continues in operation 216 to fit the basis function using the next number of knots/pairs with the set of polynomial degree/periods $N_D$.

Referring to FIG. 2B, in an operation 232, a basis function having the best fit is determined from the stored criterion fit values of the average fit basis function. For example, a minimum criterion fit value may be identified from the stored criterion fit values, and the associated knot number $N_{BFK}$ and the associated polynomial degree/period $N_{BFD}$ may be selected with the associated coefficients to describe the best fit basis function. In alternative embodiments, a maximum criterion fit value may indicate the best fit basis function.

In an operation 234, a criterion fit graph is presented in display 116. For example, referring to FIG. 3A, a criterion fit graph 300 is presented in data explorer window 700 on display 116. An x-axis of criterion fit graph 300 is the number of internal knots though it could also present the number of pairs when Fourier basis is selected as the type of basis function. A y-axis of criterion fit graph 300 is the criterion fit value. Criterion fit graph 300 includes a curve defined for each polynomial degree/period of the set of polynomial degree/periods $N_D$. For example, for $N_D=\{0, 1, 2, 3\}$, a first curve 302 shows the criterion fit value as a function of the number of internal knots for $N_D=0$; a second curve 304 shows the criterion fit value as a function of the number of internal knots for $N_D=1$; a third curve 306 shows the criterion fit value as a function of the number of internal knots for $N_D=2$; a fourth curve 308 shows the criterion fit value as a function of the number of internal knots for $N_D=3$. Each curve of FIG. 3A may represent the number of pairs when Fourier basis is selected as the type of basis function. A number of internal knots line 310 indicates the number of internal knots of the basis function having the best fit though it could also present the number of pairs when Fourier basis is selected as the type of basis function. In the illustrative example presented in FIG. 3A, the basis function having the best fit is provided by $N_D=1$ as indicated by second curve 304 such that $N_{BFK}=4$ and $N_{BFD}=1$.

Referring again to FIG. 2B, in an operation 236, a best fit basis function graph is presented in display 116. For example, referring to FIG. 3B, a best fit basis function graph 312 is presented in data explorer window 700 on display 116. For illustration, criterion fit graph 300 and best fit basis function graph 312 may be presented simultaneously and side by side in the same user interface window, for example, as shown referring to FIG. 7C discussed further below. An x-axis of best fit basis function graph 312 is the explanatory variable quantile value. A y-axis of best fit basis function graph 312 is the response variable value. A best fit basis function curve 314 is a plot of the response variable value as a function of the explanatory variable quantile value, wherein the response variable value is computed using the coefficients that describe the best fit basis function.

Best fit basis function graph 312 includes a knot location line defined for each internal knot location determined at the evenly spaced quantiles of the explanatory variable values read from FDOE dataset 124 based on the associated knot number $N_{BFK}$. In the illustrative example of best fit basis function graph 312, $N_{BFK}=4$, as shown by number of internal knots line 310. As a result, a first internal knot location line 316 shows a first quantile value at 0.2; a second internal knot location line 318 shows a second quantile value at 0.4; a third internal knot location line 320 shows a third quantile value at 0.6; and a fourth internal knot location line 322 shows a fourth quantile value at 0.8.

Best fit basis function graph 312 further includes scatter plot points 324 overlaid on best fit model curve 314. Scatter plot points 324 include a symbol for each pair of the response variable value and the quantile value computed for each explanatory variable value of each observation vector read from FDOE dataset 124. Scatter plot points 324 provide a visual indication of the distribution of the data relative to the best fit basis function.

Data explorer window 700 further includes an update models button 326 and a reset knots button 328 described below. For the Fourier basis function, reset knots button 328 may be replaced with a reset pairs button. After presentation of criterion fit graph 300 and best fit basis function graph 312, a user may slide number of internal knots line 310 right or left, may slide internal knot location line 316, 318, 320, 322 (based on the number of internal knot locations) right or left, and/or may select update models button 326 or reset knots button 328. As understood by a person of skill in the art, model selection application 122 receives indicators of the user's interactions with the user interface window and responds based on the received indicator to update criterion fit graph 300 and best fit basis function graph 312.

Referring again to FIG. 2B, in an operation 238, a determination is made concerning whether the number of internal knots line 310 is slid right or left by the user to adjust the number of internal knots. When the number of internal knots is adjusted, processing continues in an operation 240. When the number of internal knots is not adjusted, processing continues in an operation 244. For example, model selection application 122 receives an indicator of where the number of internal knots line 310 is dropped to define a new value for the current number of knots/pairs $N_{CK}$ based on the user interaction.

In operation 240, a basis function having the best fit based on the new value for the current number of knots/pairs $N_{CK}$ is determined from the stored criterion fit values. For example, a minimum criterion fit value may be identified from the stored criterion fit values based on the new value for the current number of knots/pairs $N_{CK}$, and the polynomial degree/period $N_{BFD}$ may be selected with the coefficients associated with the best fit basis function having the current number of knots/pairs $N_{CK}$. Again, a basis function is fit for each value of the group variable g and an average fit basis function is computed from the values computed for each value of the group variable g.

In an operation 242, a criterion fit graph associated with the new value for the current number of knots/pairs $N_{CK}$ is presented in display 116. For example, referring to FIG. 4A, a second criterion fit graph 400 is presented in data explorer window 700 on display 116. Second criterion fit graph 400 is identical to criterion fit graph 300 except that number of internal knots line 310 has been moved to indicate the new value for the current number of knots/pairs $N_{CK}=2$. The basis function having the best fit is provided by $N_{BFD}=2$ as indicated by third curve 306.

Processing continues in operation 236 to update the best fit basis function graph presented in display 116. For example, referring to FIG. 4B, a second best fit basis function graph 412 is presented in the user interface window of model selection application 122 on display 116 in response to $N_{CK}=2$. A second best fit model curve 414 is a plot of the response variable value as a function of the explanatory variable quantile value using $N_{CK}=2$, the associated polynomial degree/period $N_{BFD}=2$, and the associated coefficients that describe the basis function for $N_{CK}=2$ and $N_{BFD}=2$.

Second best fit basis function graph 412 includes a knot location line or a pair location line defined for each internal knot location or pair location determined at the evenly spaced quantiles of the explanatory variable values read from FDOE dataset 124 based on $N_{CK}=2$. As a result, first internal knot location line 316 shows a first quantile value at 0.33, and second internal knot location line 318 shows a second quantile value at 0.66.

In operation 244, a determination is made concerning whether update models button 326 is selected by the user to update the basis functions based on one or more new locations of the internal knots/pairs. When update models button 326 is selected, processing continues in an operation 246. When update models button 326 is not selected, processing continues in an operation 262. For example, model selection application 122 receives an indicator that the user has selected update models button 326.

In operation 246, the one or more new locations of the internal knots/pairs is determined. For example, model selection application 122 receives an indicator of a new quantile value location for first internal knot location line 316 and/or for second internal knot location line 318 to define the one or more new locations of the internal knots/pairs for the current number of knots/pairs $N_{CK}$. For example, referring to FIG. 5B, a third best fit basis function graph 512 is presented in data explorer window 700 on display 116 in response to moving first internal knot location line 316 to the first quantile value at 0.2 and second internal knot location line 318 to the second quantile value at 0.8.

In an operation 248, a current polynomial degree/period $N_{CD}$ is selected from the set of polynomial degree/periods $N_D$. For example, a first polynomial degree/period is selected from the set of polynomial degree/periods $N_D$.

In an operation 250, a basis function is fit to the response variable value and the quantile value computed for each explanatory variable value of each observation vector read from FDOE dataset 124 using the current number of knots/pairs $N_{CK}$ and the current polynomial degree/period $N_{CD}$ and based on the type of basis function indicated in operation 206. The internal knot locations are the one or more new locations of the internal knots/pairs for the current number of knots/pairs $N_{CK}$, the first external knot location at quantile level zero, and the last external knot location at quantile level one. Again, a basis function is fit for each value of the group variable g and an average fit basis function is computed from the values computed for each value of the group variable g.

In an operation 252, a criterion fit value is computed for the computed basis function based on the fit criterion method selected in operation 212 for each value of the group variable g and for the average fit basis function.

In an operation 254, coefficients that describe the computed basis function and the computed criterion fit value may be stored in computer-readable medium 108 in association with the current number of knots/pairs $N_{CK}$, the current polynomial degree/period $N_{CD}$, the value of group variable g, and/or an indicator of the average fit basis function.

In an operation 256, a determination is made concerning whether there is another polynomial degree/period of the set of polynomial degree/periods to evaluate. When there is another polynomial degree/period, processing continues in an operation 258. When there is not another polynomial degree/period, processing continues in an operation 260.

In operation 258, a next polynomial degree/period is selected from the set of polynomial degree/periods $N_D$ as the current polynomial degree/period $N_{CD}$, and processing continues in operation 250 to fit the basis function using the next polynomial degree/period.

In operation 260, the basis function having the best fit is determined from the stored criterion fit values. For example, a minimum criterion fit value may be identified from the stored criterion fit values for the current number of knots/pairs $N_{CK}$ with the one or more new locations of the internal knots/pairs, and the polynomial degree/period $N_{BFD}$ may be selected with the coefficients associated with the best fit basis function. Processing continues in operation 234 to update the criterion fit graph and the best fit basis function graph presented in data explorer window 700.

Figure 5A:
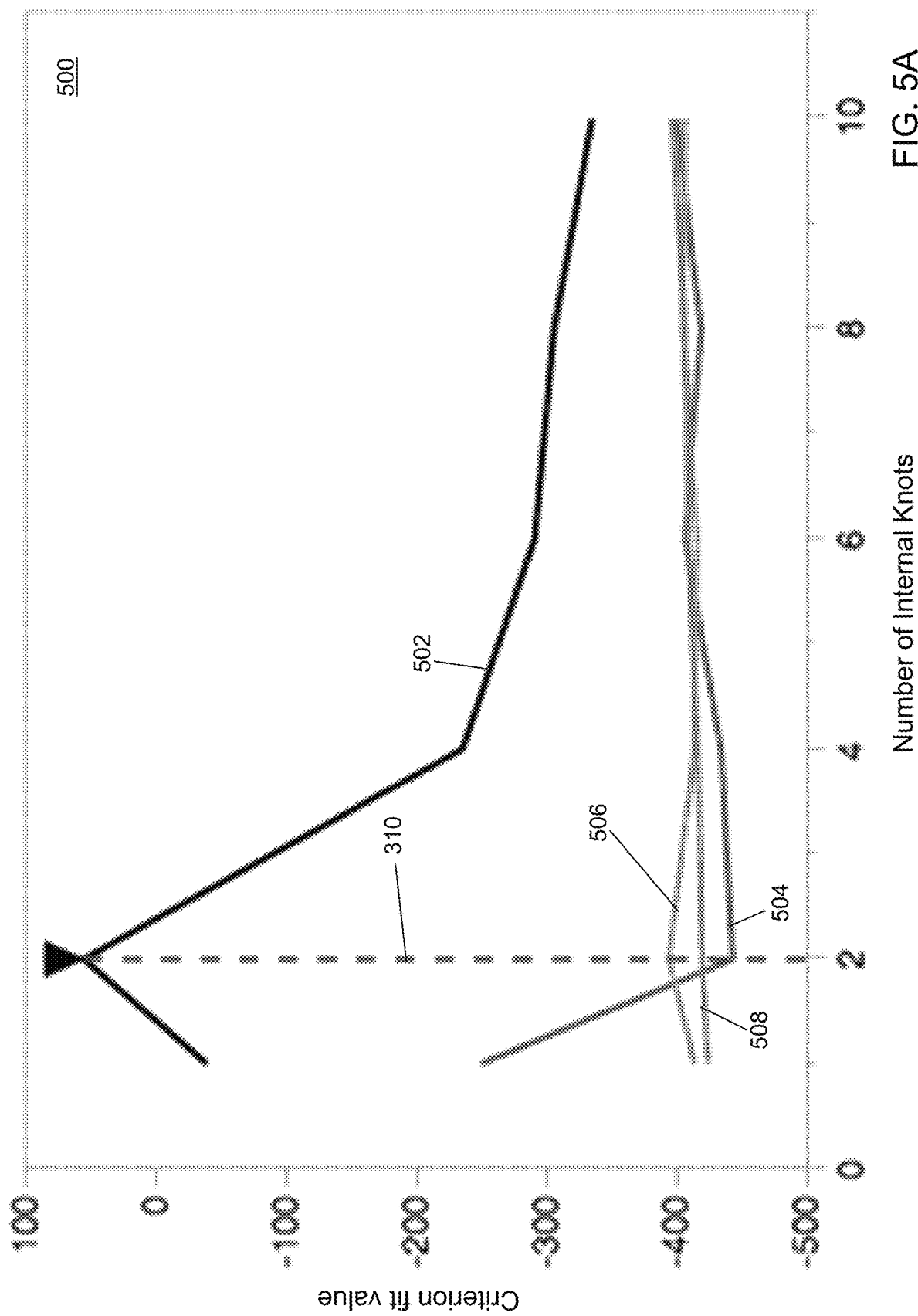
Figure 5B:
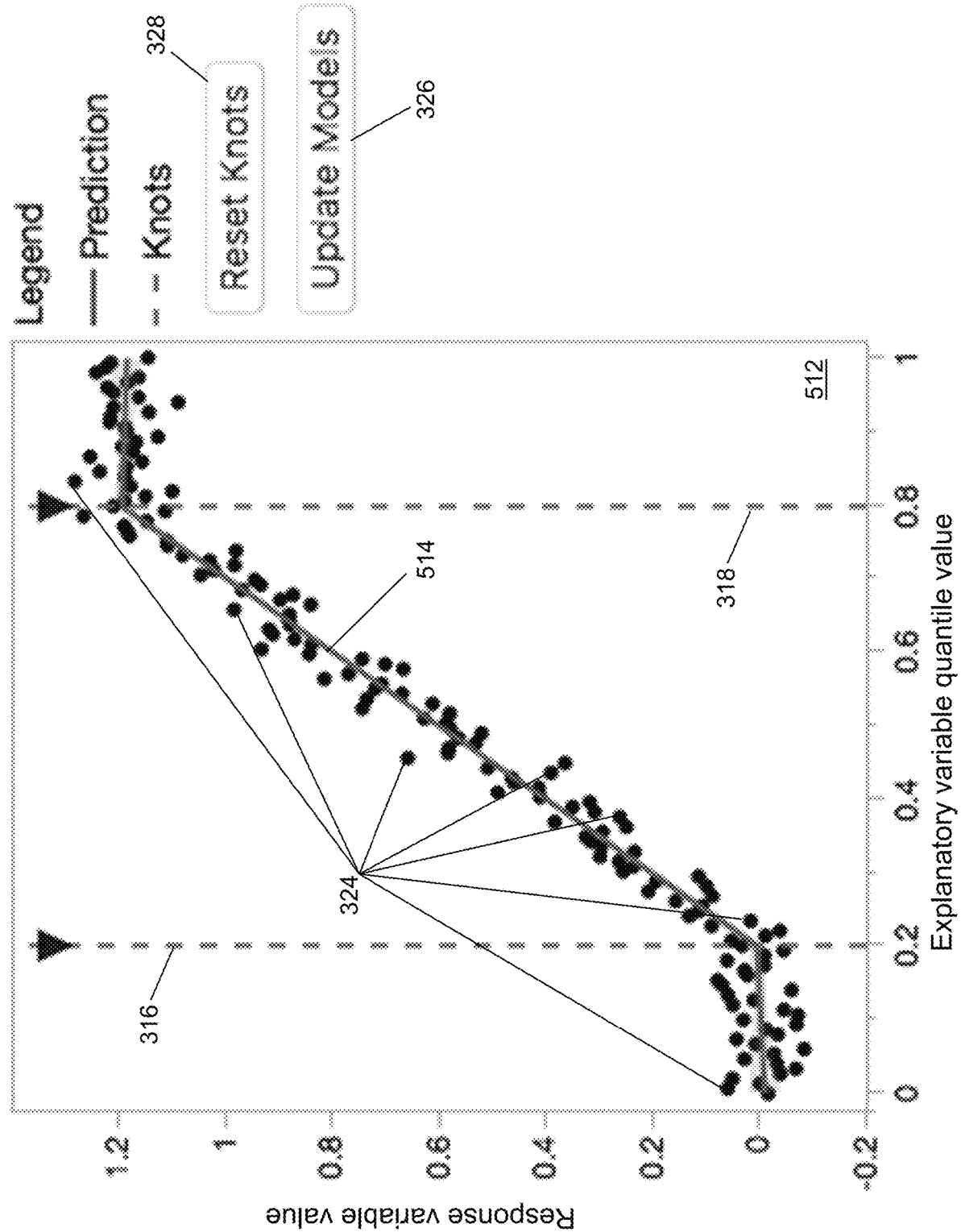

For example, referring to FIG. 5A, a third criterion fit graph 500 is presented in data explorer window 700 on display 116. Third criterion fit graph 500 includes a curve defined for each polynomial degree/period of the set of polynomial degree/periods $N_D$ computed in operations 250 and 252 with the one or more new locations of the internal knots/pairs for the current number of knots/pairs $N_{CK}$. For example, for $N_D=\{0, 1, 2, 3\}$, a fifth curve 502 shows the criterion fit value as a function of the number of internal knots for $N_D=0$; a sixth curve 604 shows the criterion fit value as a function of the number of internal knots for $N_D=1$; a seventh curve 506 shows the criterion fit value as a function of the number of internal knots for $N_D=2$; an eighth curve 508 shows the criterion fit value as a function of the number of internal knots for $N_D=3$. The basis function having the best fit is provided by $N_D=1$ as indicated by sixth curve 604.

Only the points of each curve 502, 504, 506, 508 computed for $N_{CK}=2$ have been updated because they are the only values that have changed. Processing continues in operation 236 to also update the best fit basis function graph presented in display 116. For example, referring again to FIG. 5B, a third best fit model curve 514 is a plot of the response variable value as a function of the explanatory variable quantile value using the one or more new locations of the internal knots/pairs for the current number of knots/pairs $N_{CK}$, the best fit polynomial degree/period $N_D=1$, and the coefficients that describe the best fit basis function for $N_{CK}=2$ and $N_D=1$.

Referring to FIG. 2C, in operation 262, a determination is made concerning whether reset knots/pairs button 328 is selected by the user to reset the basis functions based on the evenly spaced quantiles determined based on the current number of knots/pairs $N_{CK}$. When reset knots/pairs button 328 is selected, processing continues in an operation 264. When reset knots/pairs button 328 is not selected, processing continues in an operation 266. For example, model selection application 122 receives an indicator that the user has selected reset knots/pairs button 328.

In operation 264, the evenly spaced quantile knot location(s) are determined based on the current number of knots/pairs $N_{CK}$, and processing continues in operation 248 to update the basis functions and the associated graphs.

In operation 266, a determination is made concerning whether the user has indicated to store the current best fit basis function to FDOE analysis description 126. When the user has indicated to store the current best fit basis function, processing continues in an operation 268. When the user has not indicated to store the current best fit basis function, processing continues in operation 238 to determine a response to a next user interaction with model selection application 122 or in one of operations 206, 208, 210, or 212 to receive new values to evaluate based on user interaction with model selection application 122. For example, model selection application 122 receives an indicator that the user has selected a save or store button or menu item or has selected new model control values or a new basis type function to evaluate.

For illustration, after selection of b-splines selector 736 and a most recent execution of operation 236, the hierarchy of sub-windows 702 may be updated to include a b-spline sub-window 744 as shown referring to FIG. 7C in accordance with an illustrative embodiment. B-spline sub-window 744 may include a model controls sub-window 746, a model selection sub-window 748, and a functional principal component analysis (FPCA) sub-window 760 (shown referring to FIG. 7D). Model controls sub-window 746 and model selection sub-window 748 are not shown in FIG. 7D for simplicity.

Model selection sub-window 748 may include a fit response graph 750 and a plurality of fit experiment response graphs 752 similar to response graph 710 and the plurality of experiment response graphs 712 though showing FDOE dataset 124 fit using a b-spline basis function and optionally adjusted by the user as described in operations 238 to 264 until the user selects a save or store button. The plurality of fit experiment response graphs 752 includes a fit experiment response graph for each value of the group variable g selected using group variable selector 616. For example, a first fit experiment response graph 754 shows the fit response graph that results for a first value of the group variable g. Fit response graph 750 includes a graph of response variable Y fit using a b-spline function as designated by the user as a function of the explanatory variable X. Fit response graph 750 includes a fit curve plotted for each value of the group variable g. Each curve may be shown using a different color, symbol, line type, etc. or otherwise labeled to distinguish each value of the group variable g.

Model selection sub-window may further include update models button 326, reset knots button 328, a selected criterion fit graph 756, and a fit statistics table 758 associated with the best fit basis function presented in fit response graph 750 for each value of the group variable g. Selected criterion fit graph 756 is similar to criterion fit graph 300 shown referring to FIG. 3A that includes number of internal knots line 310. Fit statistics table 758 includes a summary of fit statistics computed for the selected b-spline basis function model.

Referring again to FIG. 2C, in operation 268, when a basis function model is fit, FPCA may be automatically performed on the functional model. Results from the FPCA, such as functional principle component scores, may be saved to a separate data table and used for feature extraction or dimension reduction.

In an operation 270, FPCA results are presented in data explorer window 700. For illustration, referring to FIG. 7D, FPCA sub-window 760 is shown in accordance with an illustrative embodiment. FPCA sub-window 760 may include an eigenvalue table 762, a mean fit response graph 764, one or more eigenfunction graphs 766, and a score sub-window 770. Score sub-window 770 is a child window of FPCA sub-window 760.

A number of the one or more eigenfunction graphs 766 is based on a number of eigenvalues listed in eigenvalue table 762. For example, a first eigenfunction graph 768 of the one or more eigenfunction graphs 766 shows a line plot of a first eigenfunction as a function of response variable Y. A number of eigenvalues may be selected by the user or may be controlled by user selection of a cumulative percent of explanation. For example, the functional principal components associated with eigenvalues that explain more than 1% variation in FDOE dataset 124 may be displayed by default though the user may adjust a value of the cumulative percent of explanation.

Score sub-window 770 may include a principal component graph 772 that plots a first functional principal component (FPC) score and a second FPC score computed for each of the plurality of fit variable response graphs 752. When there are more than two FPCs, the user can select different FPCs to include in principal component graph 772 using first drop down 773 or second drop down 774. Principal component graph 772 can be used to detect functions that are outliers from the other functions.

Referring again to FIG. 2C, in an operation 272, an indicator of a user request to perform FDOE is received. For illustration, referring to FIG. 7E, after selecting open/close menu selector 705 of b-spline sub-window 744, a fit options menu 780 is presented. Fit options menu 780 may include a model selection selector 782, a basis plot selector 783, a diagnostic plot selector 784, a function summary selector 785, a basis function coefficients selector 786, a random coefficients selector 787, an FPCA selector 788, an FDOE analysis selector 789, a save data selector 790, and a remove fit selector 791.

Selection of forward arrow 732 of model selection selector 782 presents a sub-menu of choices to use as the model selection criteria. For example, the choices may include AICc, BIC, GCV, etc. Successive selection of basis plot selector 783 toggles between showing or hiding a plot of all the basis functions on one graph. Successive selection of diagnostic plot selector 784 toggles between showing or hiding a diagnostic plot sub-window. Successive selection of function summary selector 785 toggles between showing or hiding a function summaries sub-window. Successive selection of basis function coefficients selector 786 toggles between showing or hiding a basis function coefficients sub-window. Successive selection of random coefficients selector 787 toggles between showing or hiding a random coefficients sub-window. Successive selection of FPCA selector 788 toggles between showing or hiding a FPCA sub-window 760. Selection of save data selector 790 saves the modeled data to a new data table. Selection of remove fit selector 791 removes the data fit, for example, b-spline sub-window 744. Illustrative selections are described in Chapter 15 titled "Functional Data Explorer" of *Predictive and Specialized Modeling* version 15.1, published by JMP, a business unit of SAS Institute Inc. of Cary, N.C., USA (September 2019).

Selection of FDOE analysis selector 789 triggers an indicator of a user request to perform FDOE. Referring again to FIG. 2C, in an operation 274, a prediction model is trained using the FPC scores for each FPC as a function of the one or more factor variables f selected in operation 205. For example, a generalized regression model is fit to each of the FPC score functions using the one or more factor variables f as model effects. Modeling the FPC scores using the one or more factor variables f supports use of the model fit to determine how a response of response variable Y changes based on the one or more factor variables f. By default, a two-degree factorial model may be fit using an estimation method of best subset. Alternatively, a model script can be specified, for example, in a data table that defines a desired model fit. Other models may be used such as a neural network model.

In an operation 276, a prediction model execution result computed using the trained prediction model is presented for each FPC. For example, selection of FDOE analysis selector 789 triggers creation of a model analysis within data explorer window 700. For illustration, referring to FIG. 8A to 8G, the hierarchy of sub-windows 702 is updated based on user selection of FDOE analysis selector 789.

Figure 8A:
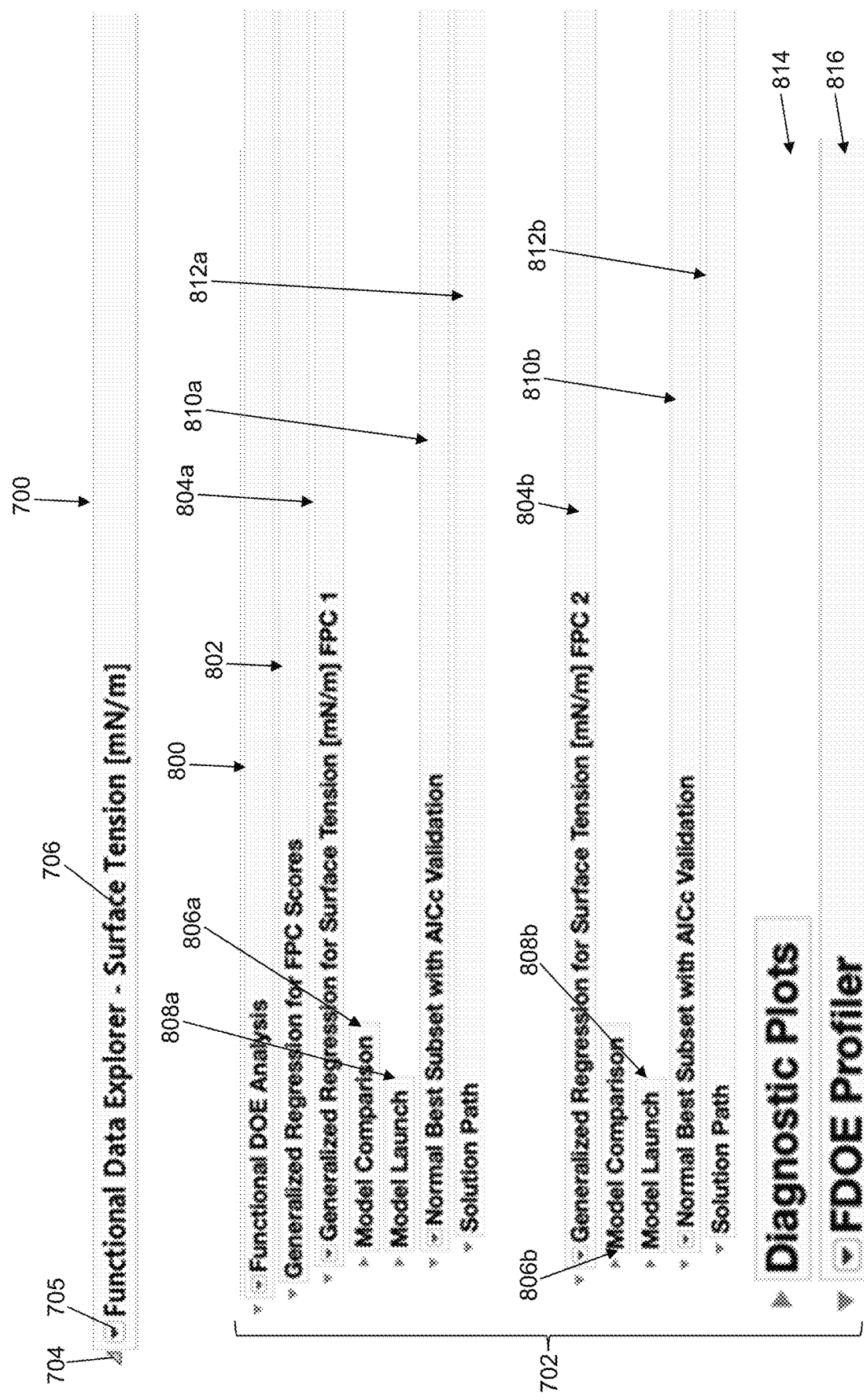

Referring to FIG. 8A, the updated hierarchy of sub-windows 702 may include a functional DOE analysis sub-window 800, an FPC score model sub-window 802, a first FPC model sub-window 804a, a first model comparison sub-window 806a, a first model launch sub-window 808a, a first model fit sub-window 810a, a first solution path sub-window 812*a*, a second FPC model sub-window 804*b*, a second model comparison sub-window 806*b*, a second model launch sub-window 808*b*, a second model fit sub-window 810*b*, a second solution path sub-window 812*b*, a diagnostic plot sub-window 814, and a profiler sub-window 816. FPC score model sub-window 802, diagnostic plot sub-window 814, and profiler sub-window 816 are sub-windows of functional DOE analysis sub-window 800. First FPC model sub-window 804*a* and second FPC model sub-window 804*b* are sub-windows of FPC score model sub-window 802. First model comparison sub-window 806*a*, first model launch sub-window 808*a*, and first model fit sub-window 810*a* are sub-windows of first FPC model sub-window 804*a*. First solution path sub-window 812*a* is a sub-window of first model fit sub-window 810*a*. Second model comparison sub-window 806*b*, second model launch sub-window 808*b*, and second model fit sub-window 810*b* are sub-windows of second FPC model sub-window 804*b*. Second solution path sub-window 812*b* is a sub-window of second model fit sub-window 810*b*. In the illustrative embodiments of FIG. 8A, there are two functional principle components resulting in two sets of FPC model sub-windows and their associated child sub-windows. In alternative embodiments, there may be a fewer or a greater number of FPC model sub-windows and their associated child sub-windows.

Figure 8B:
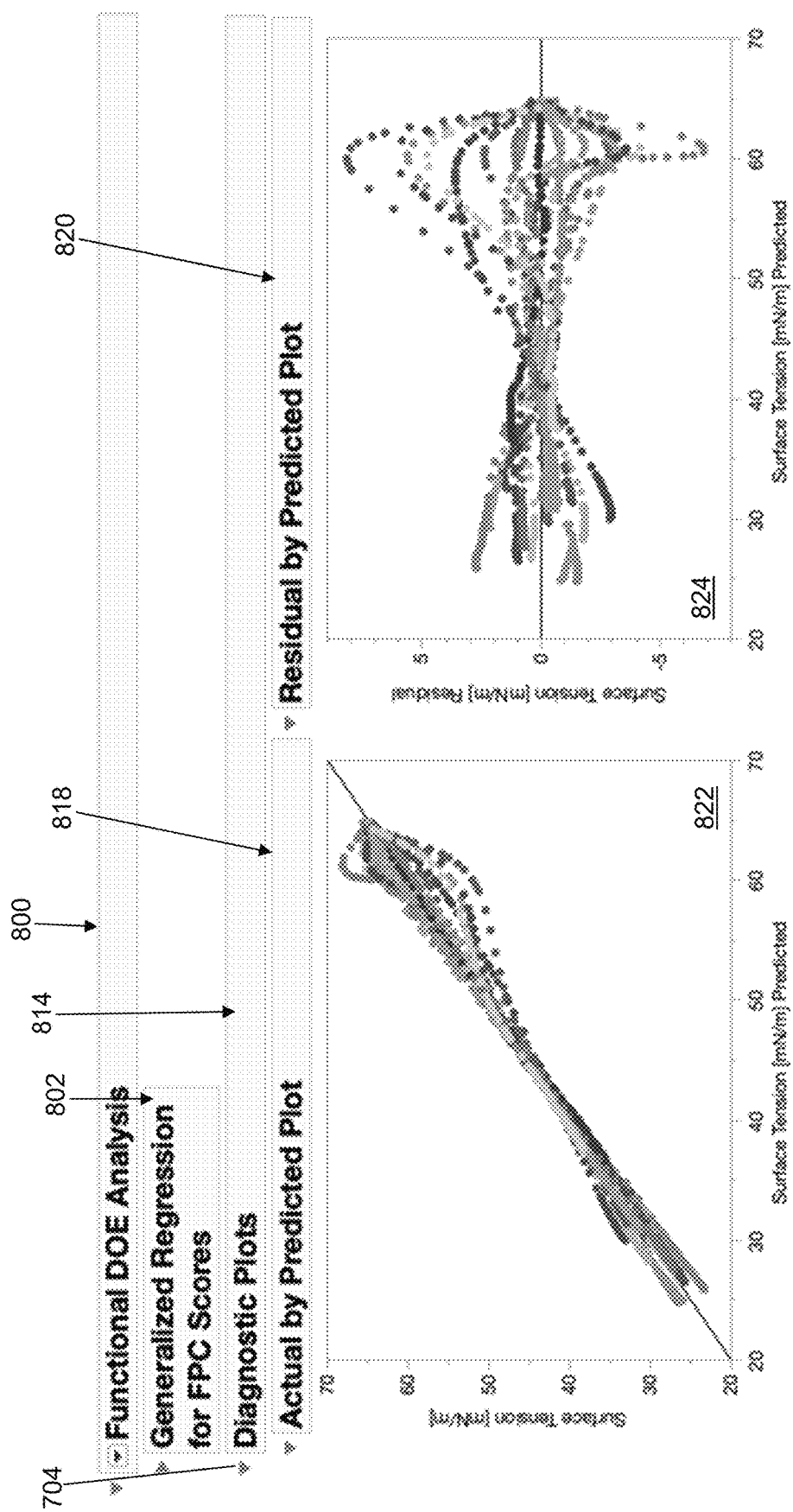

Referring to FIG. 8B, diagnostic plot sub-window 814 may include an actual prediction comparison sub-window 818 and a prediction residual comparison sub-window 820. Selection of open/close sub-window selector 704 of diagnostic plot sub-window 814 displays or hides actual prediction comparison sub-window 818 and prediction residual comparison sub-window 820. Actual prediction comparison sub-window 818 includes an actual graph 822 that shows response variable Y read from FDOE dataset 124 for each value of the group variable g on a vertical axis and a predicted response variable value Y for each value of the group variable g on a horizontal axis. The predicted response variable value is predicted using the generalized regression model with the observation vectors read from FDOE dataset 124 for each value of the group variable g. Actual graph 822 includes a separate curve for each value of the group variable g in FDOE dataset 124. Each curve may be shown using a different color, symbol, line type, etc. or otherwise labeled to distinguish each value of the group variable g.

Prediction residual comparison sub-window 820 includes a residual graph 824 that shows a difference between response variable Y and the predicted response variable value Y for each value of the group variable g on the vertical axis and the predicted response variable value Y for each value of the group variable g on the horizontal axis. Residual graph 824 includes a separate curve for each value of the group variable g in FDOE dataset 124. Each curve may be shown using a different color, symbol, line type, etc. or otherwise labeled to distinguish each value of the group variable g. Actual graph 822 and residual graph 824 provide a visual evaluation of how well the generalized regression model models the observation vectors read from FDOE dataset 124 for each value of the group variable g.

Figure 8C:
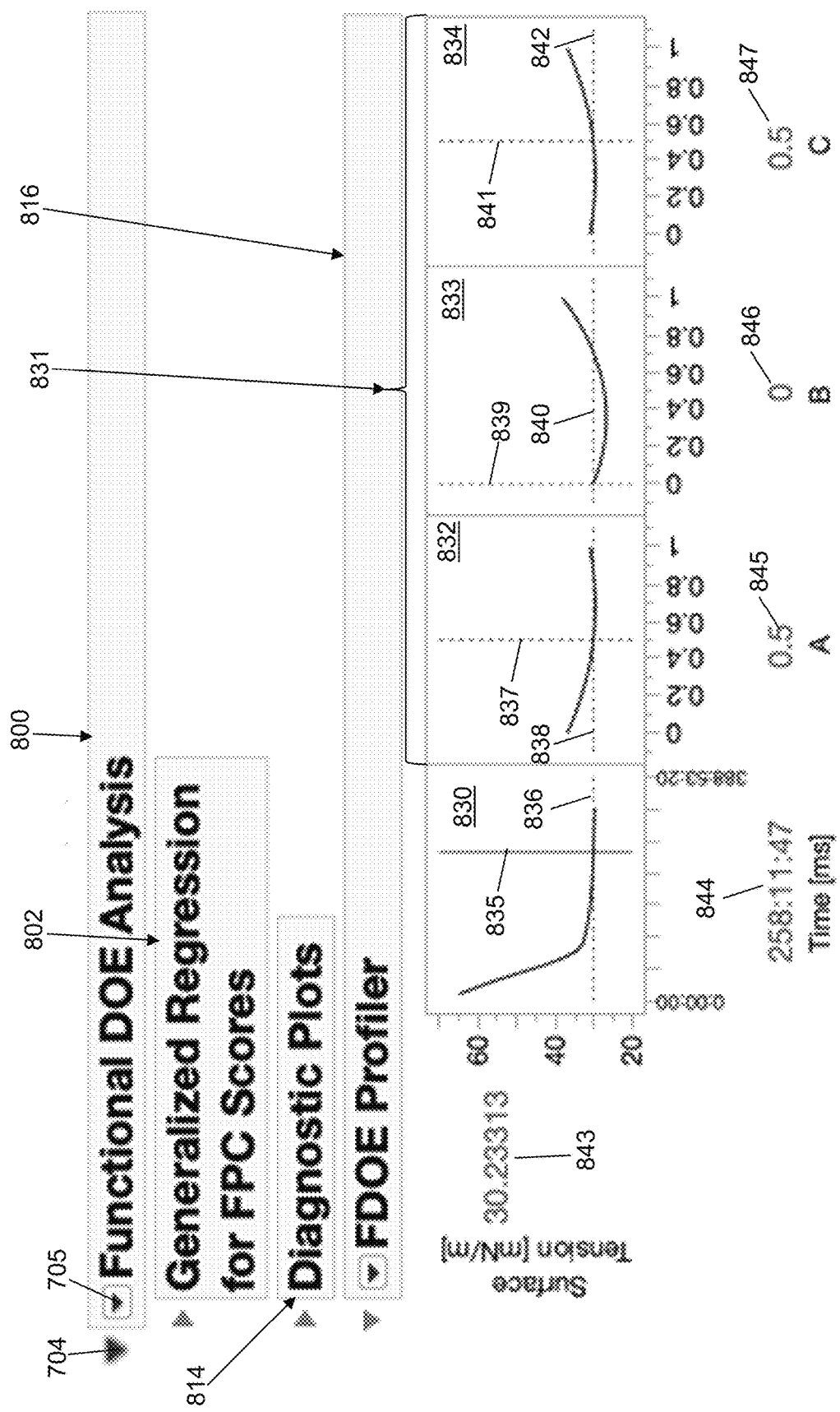

Referring to FIG. 8C, profiler sub-window 816 may include a prediction graph 830 and one or more factor profile graphs 831. The one or more factor profile graphs 831 include a profile trace for each factor variable of the one or more factor variables f to show how response variable Y varies as a function of each respective factor variable. For example, in the illustrative embodiment, the three factor variables "A", "B", and "C" were selected using f-variable selector 618. A first factor profile graph 832 shows response variable Y as a function of factor variable "A". A second factor profile graph 833 shows response variable Y as a function of factor variable "B". A third factor profile graph 834 shows response variable Y as a function of factor variable "C". Profiler sub-window 816 can be used to show how changing one factor at a time effects the predicted values of response variable Y shown in a response curve of prediction graph 830.

Each of prediction graph 830 and the one or more factor profile graphs 831 present a profile based on the trained prediction model, which in the illustrative embodiment is the two-degree factorial model using an estimation method of best subset and a validation method of AICc. The curve within each of first factor profile graph 832, second factor profile graph 833, and third factor profile graph 834 show a profile trace for each the three factor variables "A", "B", and "C", respectively. A profile trace is a predicted response as one factor variable is changed while the other factor variables are held constant at their current values.

The trained prediction model can be modified by the user. For example, first model launch sub-window 808*a* and second model launch sub-window 808*b* may include model sub-windows (not shown) such as a response distribution sub-window, an estimation method sub-window, a validation method sub-window. The validation method sub-window may provide options for selecting methods available for validation of the model fit such as BIC, AICc, k-fold, etc. The user can select one of the sub-windows of first model launch sub-window 808*a* or second model launch sub-window 808*b* to change the model definition. The trained prediction model can further be modified using selectors in profiler sub-window 816 adjustment of which results in recomputing the profile traces and predicted responses and an automatic update of the information shown, for example, in prediction graph 830 and in one or more of the factor profile graphs 831.

A response vertical line 835 is presented in prediction graph 830. A first factor adjustment line 837 is presented in first factor profile graph 832, a second factor adjustment line 839 is presented in second factor profile graph 833, and a third factor adjustment line 840 is presented in third factor profile graph 834. Each adjustment line 837, 839, 841 is initially presented in association with a best fit model based on model parameters selected for the trained prediction model. The user can drag and drop any of first factor adjustment line 837, second factor adjustment line 839, or third factor adjustment line 841 to explore how the prediction model results change as the value of individual factors changes. Movement of any of first factor adjustment line 837, second factor adjustment line 839, and third factor adjustment line 841 changes the value of the respective factor. Movement of any of first factor adjustment line 837, second factor adjustment line 839, and third factor adjustment line 841 results in showing a vertical slice across each factor while holding the other factors at their current values. The prediction trace for the factor associated with the moved adjustment line 837, 839, 841 may not be affected, but the prediction trace of the other factors may change.

A response adjustment line 836 is presented in prediction graph 830, a first response adjustment line 838 is presented in first factor profile graph 832, a second response adjustment line 840 is presented in second factor profile graph 833, and a third response adjustment line 841 is presented in third factor profile graph 834. The adjustment lines 836, 838, 840, 842 are vertically aligned with each other and indicate a current predicted value of the response variable Y that crosses an intersection point of the profile traces to define their current value lines. If there are interaction effects or cross-product effects in the trained prediction model, the profile trace can shift their slope and curvature as any factor value is changed. If there are no interaction effects, the traces change only in height, not slope or shape. The user may also drag and drop any of response adjustment line 836, first response adjustment line 838, second response adjustment line 840, and third response adjustment line 842 to explore how the factor values change as the current value of the response variable Y changes.

The current value of the response variable Y is shown by a response indicator 843. Response adjustment line 836 graphically shows the current value of the response variable Y. The current value of the explanatory variable X is shown by an explanatory variable indicator 844. Response vertical line 835 graphically shows the current value of the explanatory variable X.

The current value of the first factor $f_1$ is shown by a first factor indicator 845. The current value of the second factor $f_2$ is shown by a second factor indicator 846. The current value of the third factor $f_3$ is shown by a third factor indicator 847. First response adjustment line 838 graphically shows the current value of the first factor $f_1$. Second response adjustment line 840 graphically shows the current value of the second factor $f_2$. Third response adjustment line 841 graphically shows the current value of the third factor $f_3$.

Figure 8D:
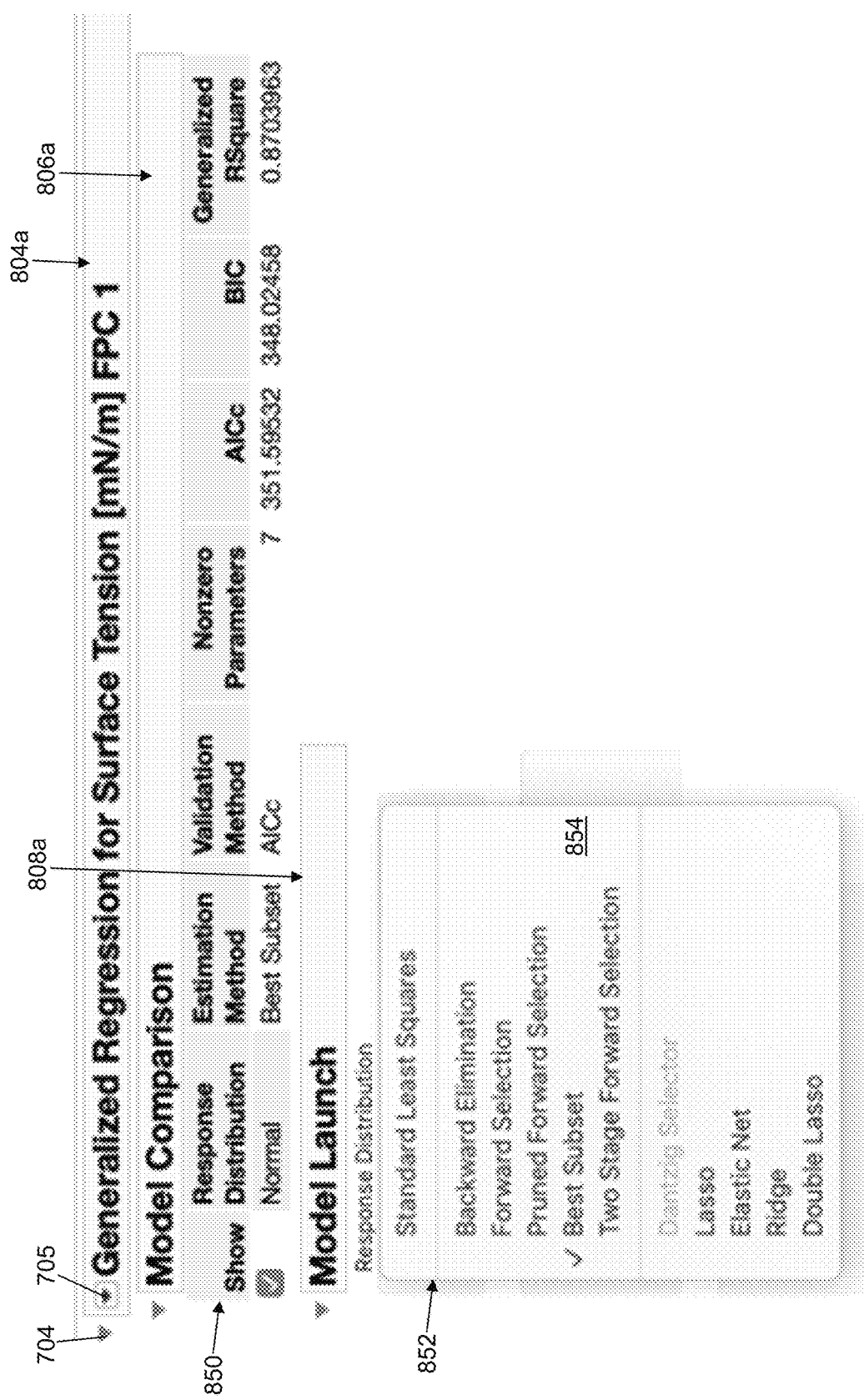

For example, referring to FIG. 8D, selection of open/close menu selector 705 of the estimation method sub-window may trigger presentation of a model menu 852 that includes a variety of modeling techniques that may be selected to model response variable Y as a function of the functional principal components computed for each value of the group variable g using the one or more factor variables f as predictors or effects. For illustration, three classes of modeling techniques may be used that include maximum likelihood, step-based estimation, and penalized regression. For example, model menu 852 may include standard least squares, backward elimination, forward selection, pruned forward selection, best subset, two-stage forward selection, Dantzig selector, Lasso, elastic net, ridge, double lasso, etc. A check mark next to a best subset selector 854 indicates the best subset estimation method is selected.

Figure 8E:
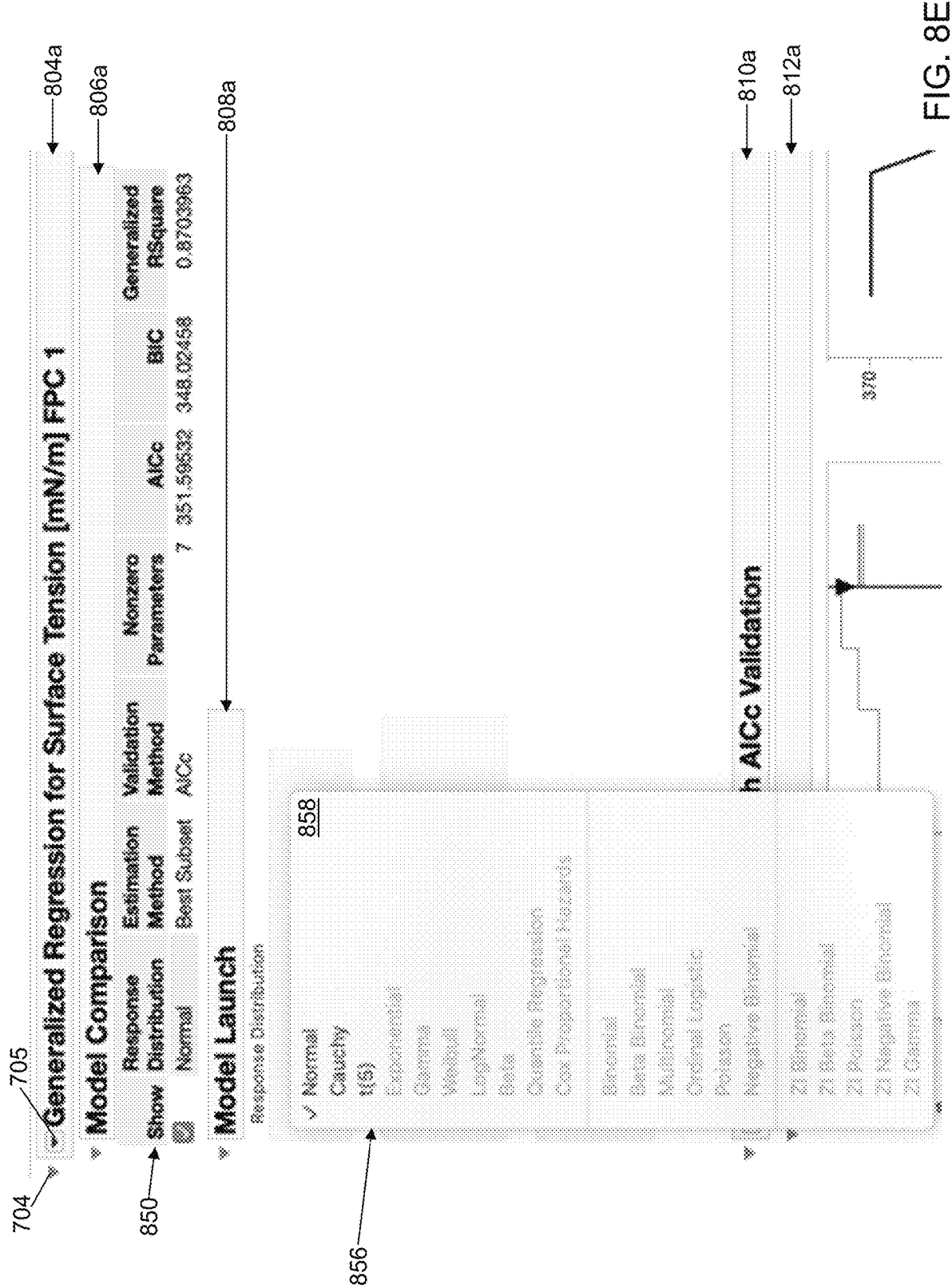

For example, referring to FIG. 8E, selection of open/close menu selector 705 of the response distribution method sub-window may trigger presentation of a distribution menu 856 that includes a variety of distributions that may be selected for response variable Y including a normal, Cauchy, t(5), exponential, gamma, Weibull, lognormal, beta, quantile regression, Cox proportional hazards models, binomial, beta binomial, multinomial, ordinal logistic, Poisson, negative binomial, zero-inflated binomial, zero-inflated beta binomial, zero-inflated Poisson, zero-inflated negative binomial, zero-inflated gamma, etc. A check mark next to a normal distribution selector 858 indicates the normal distribution function is selected. The non-grayed elements shown in model menu 852 may vary based on the distribution method selected from distribution menu 856.

Based on selections from sub-windows and/or menus associated with first FPC model sub-window 804a or second FPC model sub-window 804b, the child windows may change as well as the information presented in each. Illustrative selections are described in *Fitting Linear Models*, version 15, published by JMP, a business unit of SAS Institute Inc. of Cary, N.C., USA (September 2019).

First model comparison sub-window 806a and second model comparison sub-window 806b present information to compare the models that have been fit. Each time a new model is defined and fit based on selection of selectors/indicators from one or more of first FPC model sub-window 804a, first model launch sub-window 808a, first model fit sub-window 810a, first solution path sub-window 812a, second FPC model sub-window 804b, second model launch sub-window 808b, second model fit sub-window 810b, second solution path sub-window 812b, and profiler sub-window 816, a row is added to a model comparison table 850, and the information presented in first FPC model sub-window 804a, first model comparison sub-window 806a, first model launch sub-window 808a, first model fit sub-window 810a, first solution path sub-window 812a, second FPC model sub-window 804b, second model comparison sub-window 806b, second model launch sub-window 808b, second model fit sub-window 810b, second solution path sub-window 812b, diagnostic plot sub-window 814, and profiler sub-window 816 is updated automatically. For example, model comparison table 850 includes a single fit model that used the normal distribution, the best subset estimation method, and a validation method of AICc though other validation methods may be selected as validation methods. For example, BIC, k-fold, leave-one-out, ERIC, holdback, etc. may optionally be selectable as validation methods. Each row of model comparison table 850 can be shown or hidden using a check box in a show column. Other columns in model comparison table 850 contain information about the fit statistics for the associated model.

Figure 8F:
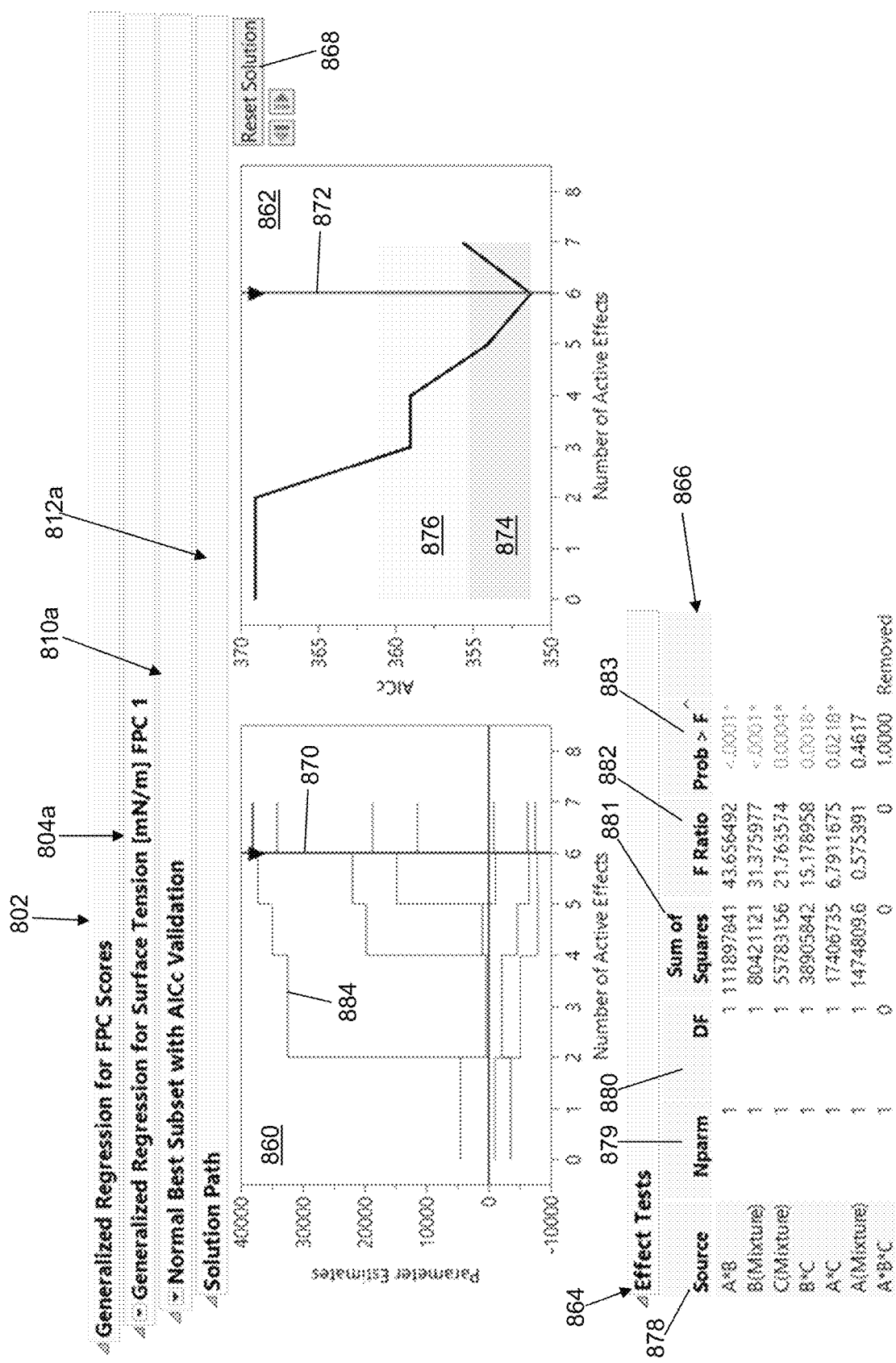

Referring to FIG. 8F, first solution path sub-window 812a may include a parameter estimate graph 860, a validation graph 862, and a reset solution button 868 for FPC 1. Parameter estimate graph 860 displays values of the estimated parameters for FPC 1. Validation graph 862 displays values of the validation statistic corresponding to the selected validation method for FPC 1. In the illustrative embodiment, AICc is the selected validation method. The horizontal scaling for both graphs is a number of active effects based on selection of the best subset estimation method. The best subset estimation method computes parameter estimates by increasing a number of active effects in the model at each step. In each step, the model is chosen among all possible models with a number of effects given by the step number. Step 0 corresponds to an intercept-only model. Step 1 corresponds to a best model of those that contain a single active effect. The steps continue up to a value of a maximum number of effects that may be defined by the user, for example, using a selector presented in first model launch sub-window 808a.

Validation graph 862 presents statistics that describe how well models fit across values of a tuning parameter, or equivalently, across values of a magnitude of scaled parameter estimates. The statistics plotted depend on the selected validation method though smaller values are better. For the k-fold and leave-one-out validation methods, and for a validation column with more than three values, the statistic may be a mean of a scaled negative log-likelihood values across the folds.

Although a model is estimated to be the best model, there can be uncertainty relative to this selection. Competing models may fit nearly as well and can contain useful information. For the AICc, BIC, k-fold, and leave-one-out validation methods, and for a validation column with more than three values, Validation graph 862 may provide a first zone 874 and a second zone 876 that are shaded, for example, using different colors to identify comparable models. Models that fall outside the zones are not recommended. First zone 874 and second zone 876 provide an interval of values of the validation statistics. First zone 874 and second zone 876 may be shown as rectangles that span the entire horizontal axis. A model falls in a zone if the value of its validation statistic falls in the zone. First zone 874 identifies models for which there is strong evidence that a model is comparable to the best model. First zone 874 may be defined as the interval [Vbest, Vbest+4]. Second zone 876 identifies models for which there is weak evidence that a model is comparable to the best model. Second zone 876 may be defined as the interval (Vbest+4, Vbest+10].

A parameter estimate line 870 and a validation line 872 are included on both graphs at a value of the number of active effects for the solution presented in actual graph 822. Initially, parameter estimate line 870 and a validation line 872 are shown at a location of the best model. An arrow at a top of parameter estimate line 870 or validation line 872 can be dragged and dropped to a new number of active effects to explore solutions within first zone 874 and second zone 876 which in turn changes the prediction model and the information presented in the related sub-windows first FPC model sub-window 804a, first model comparison sub-window 806a, first model launch sub-window 808a, first model fit sub-window 810a, and first solution path sub-window 812a.

A user may further click anywhere in validation graph 862 to change the prediction model. As validation line 872 is moved to indicate a new model, a dashed vertical line remains at a best fit model. Selection of reset solution button 868 returns parameter estimate line 870 and validation line 872 to the initial best fit solution and, again, the information presented in the related sub-windows is updated accordingly.

An effect tests sub-window 864 is a child window of first model fit sub-window 810a and a sibling window relative to first solution path sub-window 812a. effect tests sub-window 864 may include an effect test table 866 for FPC 1. Effect test table 866 may include a source column 878, a number of parameters column 879, a degrees of freedom column 880, a sum of squares column 881, an f-ratio column 882, and a p-value column 883. Source column 878 may include a list of effects that can be included in the prediction model. Number of parameters column 879 may include a number of parameters associated with each effect included in the list of effects. Degrees of freedom column 880 may include a degrees of freedom for a Wald chi-square test associated with each effect included in the list of effects, which is a number of nonzero parameter estimates associated with the effect in the model. Sum of squares column 881 may include a sum of squares for an hypothesis that the effect included in the list of effects is zero. F-ratio column 882 may include an f-statistic for testing that the effect included in the list of effects is zero. The f-statistic is a ratio of a mean square for the effect divided by a mean square for the error. The mean square for the effect is the sum of squares for the effect divided by its degrees of freedom. P-value column 883 may include a p-value for the effect test associated with each effect included in the list of effects.

Selection of an effects line, such as effects line 884, shown in parameter estimate graph 860 triggers a highlight of corresponding terms in effect tests sub-window 864. Selecting a row in effect tests sub-window 864 highlights a corresponding path in effect test table 866. Multiple paths or rows may be selected.

Figure 8G:
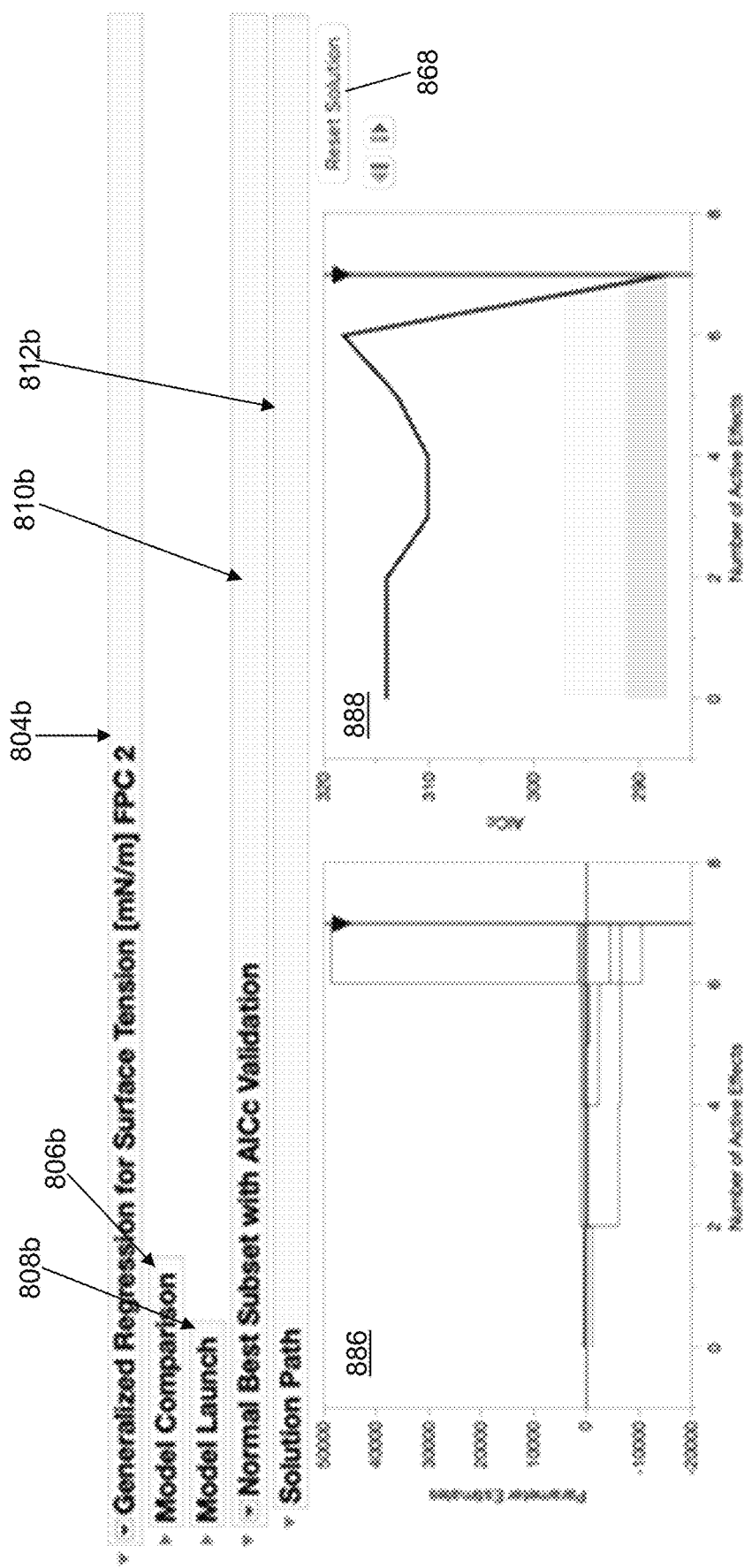

Referring to FIG. 8G, second solution path sub-window 812b may include a parameter estimate graph 886, a validation graph 888, and reset solution button 868 for FPC 2. Parameter estimate graph 886 for FPC 2 is similar to parameter estimate graph 860 for FPC 1, and validation graph 888 for FPC 2 is similar to validation graph 862 for FPC 1. Though not shown, effect tests sub-window 864 may be presented that is a child window of second model fit sub-window 810b and a sibling window relative to second solution path sub-window 812b.

Referring again to FIG. 2C, in an operation 278, a determination is made concerning whether the user has adjusted the model, for example, using a selector/indicator from one or more of first FPC model sub-window 804a, first model launch sub-window 808a, first model fit sub-window 810a, first solution path sub-window 812a, second FPC model sub-window 804b, second model launch sub-window 808b, second model fit sub-window 810b, second solution path sub-window 812b, and profiler sub-window 816. When the user has adjusted the model, processing continues in operation 274 to train a new prediction model with the new parameters and automatically update the information presented in one or more of first FPC model sub-window 804a, first model launch sub-window 808a, first model fit sub-window 810a, first solution path sub-window 812a, second FPC model sub-window 804b, second model launch sub-window 808b, second model fit sub-window 810b, second solution path sub-window 812b, and profiler sub-window 816. When the user has not adjusted the model, processing continues in an operation 280.

In operation 280, a determination is made concerning whether the user has indicated that the analysis is done. When the user has indicated that the analysis is done, processing continues in operation 238 to determine a response to a next user interaction with model selection application 122 or in one of operations 206, 208, 210, or 212 to receive new values to evaluate based on user interaction with model selection application 122. When the user has indicated that the analysis is not done, processing continues in an operation 280.

In operation 282, analysis information is written to and stored in FDOE analysis description 126, and processing may be stopped. For example, the coefficients for the current best fit basis function, the current number of knots/pairs $N_{CK}$, $N_{BFD}$, and the one or more current locations of the internal knots/pairs are written to and stored in FDOE analysis description 126. An error value and/or a residual value may be computed between results generated using the current best fit basis function and the values read from FDOE dataset 124. The computed error value and/or a residual value also may be written to and stored in FDOE analysis description 126. A log-likelihood for computing the AIC, the BIC, etc. also may be stored. Information that describes the FPCA results, and/or model trained in operation 274 may further be written to and stored in FDOE analysis description 126.

Model selection application 122 allows the user to interactively adjust the number of internal knots/pairs and their locations to interactively determine a best fit basis function that is otherwise difficult to identify through adaptive procedures or is difficult to quickly identify due to the very large set of parameters needed to evaluate that makes the determination computationally very expensive. The process is automatically initiated to provide the user with an initial evaluation based on evenly spaced quantile locations for the internal knot locations. After adjusting the number of knots/pairs and/or their locations, the user receives immediate feedback on the result of their selection. Additionally, the overlay of the data points assists the user in visually identifying potentially better knot locations. As a result, model selection application 122 allows the user to control the process by which the best model is defined and to use their expertise in selecting knot locations with fast updating and determination of a best polynomial degree/period for a selected number of knots/pairs and knot locations.

As stated previously, model selection application 122 is easy to use and provides approximately instantaneous feedback so that the user can quickly and efficiently change a location of one or more knots/pairs interactively. Alternative solutions require the user to specify the exact locations of all knots/pairs, while model selection application 122 allows the user to easily change all or any subset of the default locations as needed.

Model selection application 122 further allows the user to interactively adjust a model of each principal component as a function of each of the one or more factor variables to better understand an effect of each of the one or more factor variables on response variable Y. For example, any of the one or more factor variables determined to have a sufficient effect on response variable Y may be variables selected to further train a predictive model. As a result, model selection application 122 identifies relevant features to be used to model response variable Y possibly reducing a dimension of the model that may be written to and stored in FDOE analysis description 126.

Figure 9:
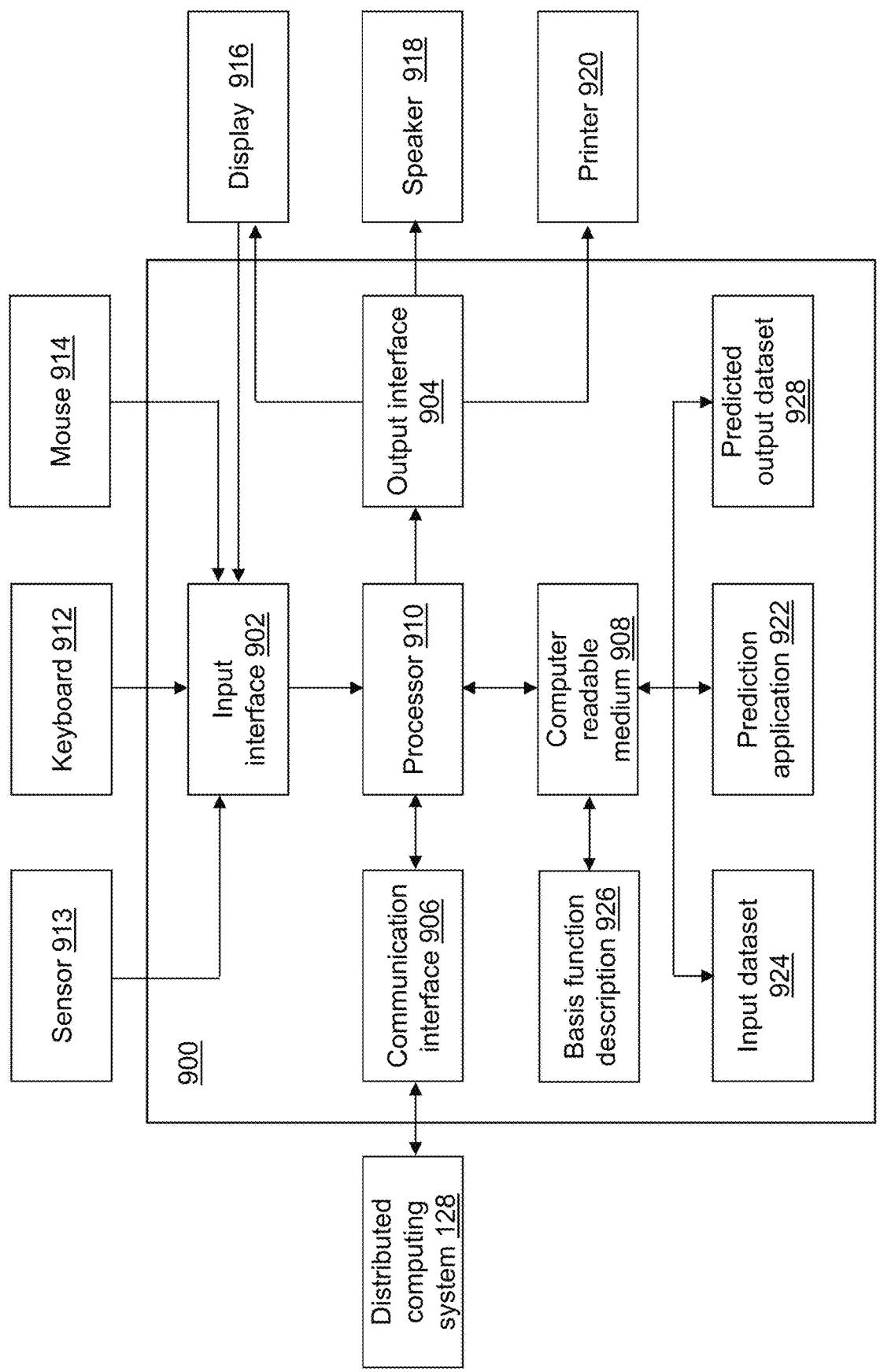
FIG. 9 depicts a block diagram of a prediction device that uses the selected model to predict a result in accordance with an illustrative embodiment.

Referring to FIG. 9, a block diagram of a prediction device 900 is shown in accordance with an illustrative embodiment. Prediction device 900 may include a second input interface 902, a second output interface 904, a second communication interface 906, a second non-transitory computer-readable medium 908, a second processor 910, a prediction application 922, basis function description 926, input dataset 924, and predicted output dataset 928. Basis function description 926 may be read or extracted from FDOE analysis description 126. Fewer, different, and/or additional components may be incorporated into prediction device 900. Prediction device 900 and model selection device 100 may be the same or different devices.

Second input interface 902 provides the same or similar functionality as that described with reference to input interface 102 of model selection device 100 though referring to prediction device 900. Second output interface 904 provides the same or similar functionality as that described with reference to output interface 104 of model selection device 100 though referring to prediction device 900. Second communication interface 906 provides the same or similar functionality as that described with reference to communication interface 106 of model selection device 100 though referring to prediction device 900. Data and messages may be transferred between prediction device 900 and distributed computing system 128 using second communication interface 906. Second computer-readable medium 908 provides the same or similar functionality as that described with reference to computer-readable medium 108 of model selection device 100 though referring to prediction device 900. Second processor 910 provides the same or similar functionality as that described with reference to processor 110 of model selection device 100 though referring to prediction device 900.

Prediction application 922 performs operations associated with predicting values for response variable Y using basis function description 926 based on values for the explanatory variable X stored in input dataset 924. Dependent on the type of data stored in FDOE dataset 124 and input dataset 924, prediction application 922 may identify anomalies as part of process control, for example, of a manufacturing process, for machine condition monitoring, for example, an electro-cardiogram device, etc. Some or all of the operations described herein may be embodied in prediction application 922. The operations may be implemented using hardware, firmware, software, or any combination of these methods.

Referring to the example embodiment of FIG. 9, prediction application 922 is implemented in software (comprised of computer-readable and/or computer-executable instructions) stored in second computer-readable medium 908 and accessible by second processor 910 for execution of the instructions that embody the operations of prediction application 922. Prediction application 922 may be written using one or more programming languages, assembly languages, scripting languages, etc. Prediction application 922 may be integrated with other analytic tools. For example, prediction application 922 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 922 further may be performed by an ESPE. Prediction application 922 and model selection application 122 further may be integrated applications.

Prediction application 922 may be implemented as a Web application. Prediction application 922 may be integrated with other system processing tools to automatically process data generated as part of operation of an enterprise using second input interface 902, second output interface 904, and/or second communication interface 906 so that appropriate action can be initiated in response. For example, a warning or an alert may be presented using a second display 916, a second speaker 918, a second printer 920, etc. or sent to one or more computer-readable media, display, speaker, printer, etc. of distributed computing system 128 based on predicted values for response variable Y.

FDOE dataset 124 and input dataset 924 may be generated, stored, and accessed using the same or different mechanisms. Similar to FDOE dataset 124, input dataset 924 may include a plurality of rows and a plurality of columns with the plurality of rows referred to as observation vectors or records, and the columns referred to as variables that are associated with an observation. Input dataset 924 may be transposed.

Similar to FDOE dataset 124, input dataset 924 may be stored on second computer-readable medium 908 or on one or more computer-readable media of distributed computing system 128 and accessed by prediction device 900 using second communication interface 906. Data stored in input dataset 924 may be a sensor measurement or a data communication value, for example, from a sensor 613, may be generated or captured in response to occurrence of an event or a transaction, generated by a device such as in response to an interaction by a user with the device, for example, from a second keyboard 912 or a second mouse 914, etc. The data stored in input dataset 924 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 924 may be captured at different time points periodically, intermittently, when an event occurs, etc. One or more columns may include a time value. Similar to FDOE dataset 124, data stored in input dataset 924 may be generated as part of the IoT, and some or all data may be pre- or post-processed by an ESPE.

Similar to FDOE dataset 124, input dataset 924 may be stored in various compressed formats such as a coordinate format, a compressed sparse column format, a compressed sparse row format, etc. Input dataset 924 further may be stored using various structures as known to those skilled in the art including a file system, a relational database, a system of tables, a structured query language database, etc. on model selection device 100, on prediction device 900, and/or on distributed computing system 128. Prediction device 900 and/or distributed computing system 128 may coordinate access to input dataset 924 that is distributed across a plurality of computing devices. For example, input dataset 924 may be stored in a cube distributed across a grid of computers as understood by a person of skill in the art. As another example, input dataset 924 may be stored in a multi-node Hadoop® cluster. As another example, input dataset 924 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 924.

Figure 10:
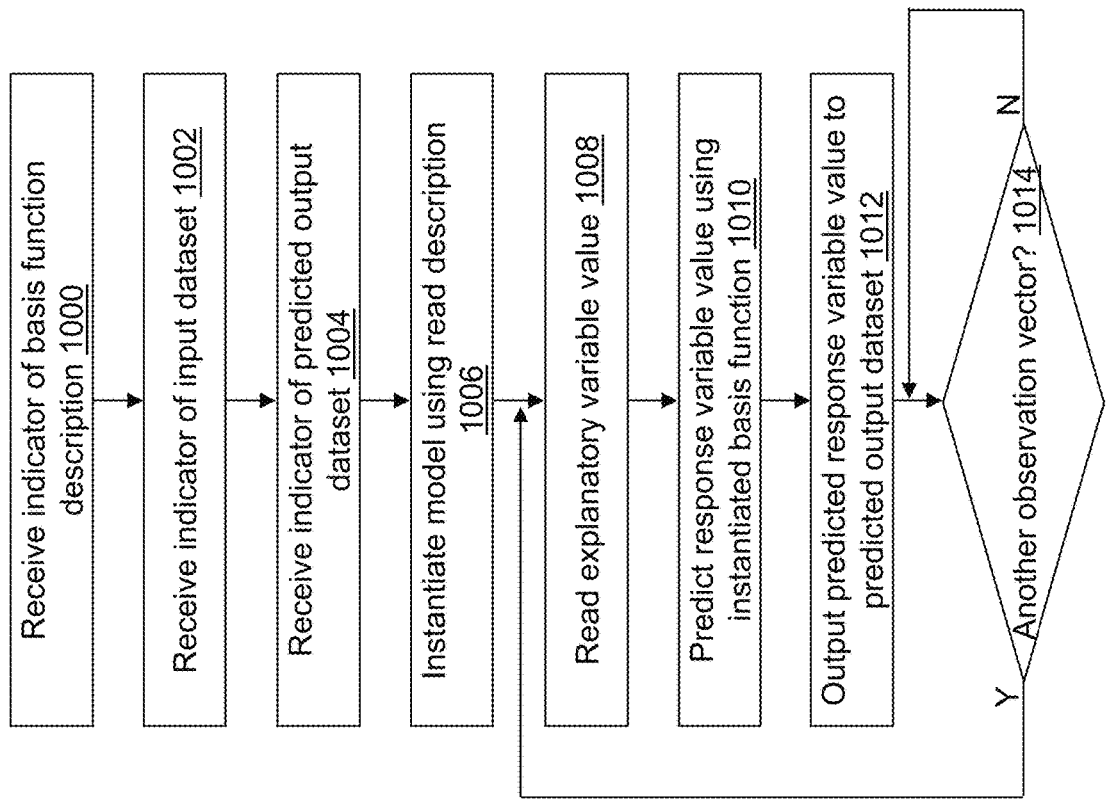
FIG. 10 depicts a flow diagram illustrating examples of operations performed by the prediction device of FIG. 9 in accordance with an illustrative embodiment.

Referring to FIG. 10, example operations of prediction application 922 are described. Additional, fewer, or different operations may be performed depending on the embodiment of prediction application 922. The order of presentation of the operations of FIG. 10 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1000, a ninth indicator may be received that indicates basis function description 926. For example, the ninth indicator indicates a location and a name of basis function description 926. As an example, the ninth indicator may be received by prediction application 922 after selection from a user interface window or after entry by a user into a user interface window. In an alternative embodiment, basis function description 926 may not be selectable. For example, a most recently created basis function description may be used automatically.

In an operation 1002, a tenth indicator may be received that indicates input dataset 924. For example, the tenth indicator indicates a location and a name of input dataset 924. As an example, the tenth indicator may be received by prediction application 922 after selection from a user interface window or after entry by a user into a user interface window. In an alternative embodiment, input dataset 924 may not be selectable. For example, a most recently created dataset may be used automatically.

In an operation 1004, an eleventh indicator may be received that indicates predicted output dataset 928. For example, the eleventh indicator indicates a location and a name of predicted output dataset 928. As an example, the eleventh indicator may be received by prediction application 922 after selection from a user interface window or after entry by a user into a user interface window. In an alternative embodiment, predicted output dataset 928 may not be selectable. For example, a default name and location for predicted output dataset 928 may be used automatically.

In an operation 1006, a basis function model is instantiated based on the basis function description read from basis function description 926. For example, the coefficients for the polynomial defined by the selected polynomial degree/period or the selected Fourier series period using the selected number of knots/pairs and their locations is instantiated.

In an operation 1008, a value x for the explanatory variable X is read from a next line of input dataset 924 or optionally is received from an ESPE.

In an operation 1010, a value y for the response variable Y is predicted using the instantiated basis function and the read value x.

In an operation 1012, the predicted value y for the response variable Y is output to predicted output dataset 928. The value x and/or other values read from input dataset further may be output to predicted output dataset 928.

In an operation 1014, a determination is made concerning whether there is another observation vector to process. When there is another observation vector to process, processing continues in operation 1008. When there is not another observation vector to process, processing continues in operation 1014 to wait for receipt of another observation vector, for example, from an ESPE, or processing is done.

Figure 11:
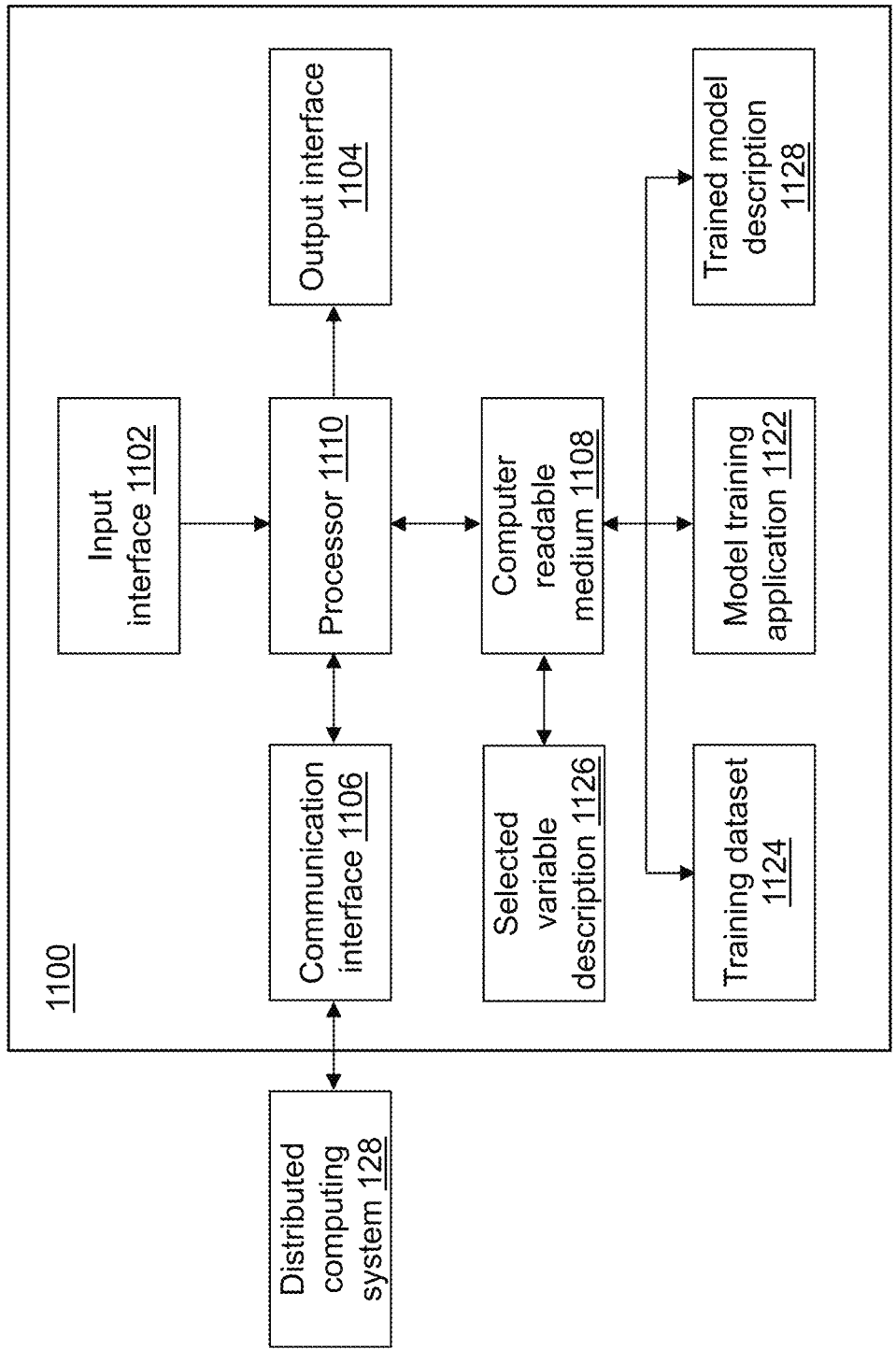
FIG. 11 depicts a block diagram of a model training device that uses variables identified as part of the model selection to train a model and predict a result in accordance with an illustrative embodiment.

Referring to FIG. 11, a block diagram of a model training device 1100 is shown in accordance with an illustrative embodiment. Model training device 1100 may include a third input interface 1102, a third output interface 1104, a third communication interface 1106, a third non-transitory computer-readable medium 1108, a third processor 1110, a model training application 1122, selected variable description 1126, training dataset 1124, and trained model description 1128. Selected variable description 1126 may be read or extracted from FDOE analysis description 126 as the features selected to train a model based on FDOE dataset 124. Training dataset may be FDOE dataset 124 in an illustrative embodiment. Fewer, different, and/or additional components may be incorporated into model training device 1100. Model training device 1100 and model selection device 100 may be the same or different devices.

Third input interface 1102 provides the same or similar functionality as that described with reference to input interface 102 of model selection device 100 though referring to model training device 1100. Third output interface 1104 provides the same or similar functionality as that described with reference to output interface 104 of model selection device 100 though referring to model training device 1100. Third communication interface 1106 provides the same or similar functionality as that described with reference to communication interface 106 of model selection device 100 though referring to model training device 1100. Data and messages may be transferred between model training device 1100 and distributed computing system 128 using third communication interface 1106. Third computer-readable medium 1108 provides the same or similar functionality as that described with reference to computer-readable medium 108 of model selection device 100 though referring to model training device 1100. Third processor 1110 provides the same or similar functionality as that described with reference to processor 110 of model selection device 100 though referring to model training device 1100.

Model training application 1122 performs operations associated with training a model to predict values for response variable Y using selected variable description 1126 based on values for the explanatory variable X stored in training dataset 1124. The parameters that describe the trained model may be stored in trained model description 1128. Dependent on the type of data stored in FDOE dataset 124 and training dataset 1124, the trained model may identify anomalies as part of process control, for example, of a manufacturing process, for machine condition monitoring, for example, an electro-cardiogram device, etc. Some or all of the operations described herein may be embodied in model training application 1122. The operations may be implemented using hardware, firmware, software, or any combination of these methods.

Referring to the example embodiment of FIG. 11, model training application 1122 is implemented in software (comprised of computer-readable and/or computer-executable instructions) stored in third computer-readable medium 1108 and accessible by third processor 1110 for execution of the instructions that embody the operations of model training application 1122. Model training application 1122 may be written using one or more programming languages, assembly languages, scripting languages, etc. Model training application 1122 may be integrated with other analytic tools. For example, model training application 1122 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of model training application 1122 further may be performed by an ESPE. Model training application 1122 and model selection application 122 further may be integrated applications. Model training application 1122 may be implemented as a Web application.

FDOE dataset 124 and training dataset 1124 may be generated, stored, and accessed using the same or different mechanisms. Similar to FDOE dataset 124, training dataset 1124 may include a plurality of rows and a plurality of columns with the plurality of rows referred to as observation vectors or records, and the columns referred to as variables that are associated with an observation. Training dataset 1124 may be transposed.

Similar to FDOE dataset 124, training dataset 1124 may be stored on second computer-readable medium 1108 or on one or more computer-readable media of distributed computing system 128 and accessed by model training device 1100 using second communication interface 1106. Data stored in training dataset 1124 may be a sensor measurement or a data communication value, for example, from a sensor 613, may be generated or captured in response to occurrence of an event or a transaction, generated by a device such as in response to an interaction by a user with the device, for example, from a second keyboard 1112 or a second mouse 1114, etc. The data stored in training dataset 1124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 1124 may be captured at different time points periodically, intermittently, when an event occurs, etc. One or more columns may include a time value. Similar to FDOE dataset 124, data stored in training dataset 1124 may be generated as part of the IoT, and some or all data may be pre- or post-processed by an ESPE.

Similar to FDOE dataset 124, training dataset 1124 may be stored in various compressed formats such as a coordinate format, a compressed sparse column format, a compressed sparse row format, etc. Training dataset 1124 further may be stored using various structures as known to those skilled in the art including a file system, a relational database, a system of tables, a structured query language database, etc. on model selection device 100, on model training device 1100, and/or on distributed computing system 128. Model training device 1100 and/or distributed computing system 128 may coordinate access to training dataset 1124 that is distributed across a plurality of computing devices. For example, training dataset 1124 may be stored in a cube distributed across a grid of computers as understood by a person of skill in the art. As another example, training dataset 1124 may be stored in a multi-node Hadoop® cluster. As another example, training dataset 1124 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in training dataset 1124.

Figure 12:
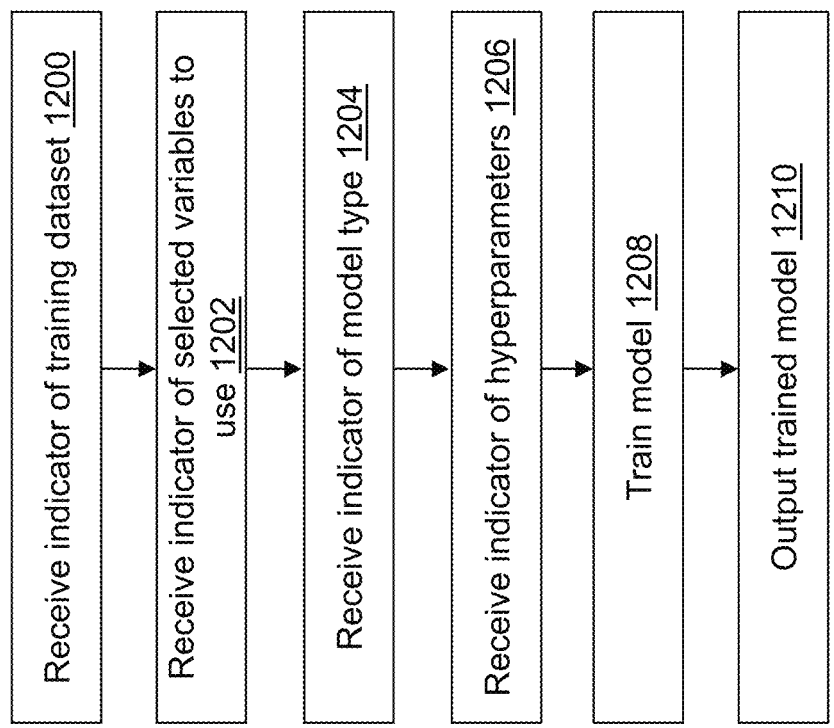
FIG. 12 depicts a flow diagram illustrating examples of operations performed by the model training device of FIG. 11 in accordance with an illustrative embodiment.

Referring to FIG. 12, example operations of model training application 1122 are described. Additional, fewer, or different operations may be performed depending on the embodiment of model training application 1122. The order of presentation of the operations of FIG. 12 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1200, a twelfth indicator may be received that indicates training dataset 1124. For example, the twelfth indicator indicates a location and a name of training dataset 1124. As an example, the twelfth indicator may be received by model training application 1122 after selection from a user interface window or after entry by a user into a user interface window. In an alternative embodiment, training dataset 1124 may not be selectable. For example, a most recently created dataset may be used automatically. Training dataset 1124 includes a number of observation vectors N.

In an operation 1202, a thirteenth indicator may be received that indicates a plurality of variables or features read from selected variable description 1126 that are to be included in training a predictive model using training dataset 1124. For example, the thirteenth indicator may indicate a plurality of column numbers or a plurality of column names. As another option, all of the columns may be used by default. Each observation vector $x_i$, i=1, ..., m read from training dataset 1124 may include a value for each variable of the plurality of variables to define m dimensions or features. Training dataset 1124 includes a set of observation vectors $X=[x_{j,i}]$, i=1, ..., m, j=1, ..., N.

In an operation 1204, a fourteenth indicator indicates a model type. For example, the fourteenth indicator indicates a name of a model type that performs prediction and/or classification. The fourteenth indicator may be received by model training application 1122 from a user interface window or after entry by a user into a user interface window. A default value for the model type may further be stored, for example, in third computer-readable medium 1108. As an example, a model type may be selected from "SVM", "K-Cluster", "Neural Network", "Logistic Regression", "Forest", "Gradient Boosting", "Decision Tree", "Factorization Machine", etc. The model type indicated by "SVM"

may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. For example, a default model type may be indicated by "Gradient Boosting". Of course, the model type may be labeled or selected in a variety of different manners by the user as understood by a person of skill in the art. In an alternative embodiment, the model type may not be selectable, and a single model type is implemented by model training application 1122. For example, the model type indicated as "Gradient Boosting" may be used by default or without allowing a selection.

In an operation 1206, a fifteenth indicator of one or more hyperparameters to use for training and validating the indicated model type and/or specified values for an automatic tuning method (autotune option) are received. Hyperparameters define values or various options that govern a training process based on the model type. The default values of these hyperparameters may not be suitable for all applications. To reduce the effort in adjusting these hyperparameters, an automatic tuning process may be used to estimate values for these hyperparameters. Optionally, the hyperparameters may be selected as an input option by a user.

In an operation 1208, a model is trained using the values of the selected variables indicated in operation 1202 for each observation vector read from training dataset 1124 indicated in operation 1200 based on the model type indicated in operation 1204, and the hyperparameters indicated in operation 1206. For example, the model may be trained and validated using another application that is distinct from model training application 1122 or is integrated with model training application 1122. Model training application 1122 performs operations associated with defining trained model description 1128. For illustration, a TREESPLIT Procedure included in SAS® Visual Data Mining and Machine Learning 8.1: Statistical Procedures developed and provided by SAS Institute Inc. of Cary, N.C., USA may be used for a decision tree model type; a FACTMAC procedure included in SAS® Visual Data Mining and Machine Learning 8.1: Data Mining and Machine Learning Procedures developed and provided by SAS Institute Inc. of Cary, N.C., USA may be used for a factorization machine model type; a FOREST procedure included in SAS® Visual Data Mining and Machine Learning 8.1: Data Mining and Machine Learning Procedures developed and provided by SAS Institute Inc. of Cary, N.C., USA may be used for a random forest model type; a GRADBOOST procedure included in SAS® Visual Data Mining and Machine Learning 8.1: Data Mining and Machine Learning Procedures developed and provided by SAS Institute Inc. of Cary, N.C., USA may be used for a gradient boosting model type; a NNET procedure included in SAS® Visual Data Mining and Machine Learning 8.1: Data Mining and Machine Learning Procedures developed and provided by SAS Institute Inc. of Cary, N.C., USA may be used for a neural network model type; a SVMACHINE procedure included in SAS® Visual Data Mining and Machine Learning 8.1: Data Mining and Machine Learning Procedures developed and provided by SAS Institute Inc. of Cary, N.C., USA may be used for a support vector machine model type; a HPLOGISTIC procedure included in SAS/STAT® 15.1 developed and provided by SAS Institute Inc. of Cary, N.C., USA may be used for a logistic regression model type; a KCLUS procedure included in SAS® Visual Data Mining and Machine Learning 8.1: Statistical Procedures developed and provided by SAS Institute Inc. of Cary, N.C., USA may be used for a k-means clustering model type; etc.

In an operation 1210, the data that describes the trained model is stored in trained model description 1128. For illustration, the trained model may be stored using the ASTORE procedure provided by SAS® Visual Data Mining and Machine Learning software. The trained model can then be used by prediction application 922 to predict a response variable value though by instantiating the trained model using trained model description 1128 instead of basis function description 926.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset that includes a plurality of observation vectors defined for each value of a plurality of values of a group variable, wherein each observation vector of each plurality of observation vectors includes an explanatory variable value of an explanatory variable and a response variable value of a response variable;

(A) fit a basis function to each plurality of observation vectors defined for each value of the plurality of values of the group variable to generate basis results, wherein the basis function is fit to the explanatory variable value and the response variable value of each observation vector of each plurality of observation vectors to define coefficients that describe the response variable based on the explanatory variable;

(B) present the generated basis results from the basis function fit to each plurality of observation vectors within a first sub-window of a first window of a display;

(C) automatically perform a functional principal component analysis (FPCA) on each basis function fit to each plurality of observation vectors to generate FPCA results;

(D) present the generated FPCA results from the performed FPCA within a second sub-window of the first window of the display, wherein the FPCA results include an eigenvalue and an eigenfunction associated with the eigenvalue for each functional principal component identified from the performed FPCA;

(E) receive an indicator of a request to perform functional analysis using the FPCA results and the dataset based on a predefined factor variable, wherein the indicator is received in association with the first window of the display, wherein each observation vector of each plurality of observation vectors further includes a factor variable value of the predefined factor variable;

(F) train a model using the eigenvalue and the eigenfunction computed as a result of the performed FPCA for each plurality of observation vectors using the factor variable value associated with each observation vector of each plurality of observation vectors as a model effect; and (G) present trained model results from the trained model within a third sub-window of the first window of the display.

2. The non-transitory computer-readable medium of claim 1, wherein a selector associated with the first window of the display provides user selection of the basis function.

3. The non-transitory computer-readable medium of claim 2, wherein the basis function is selected from the group consisting of a b-splines basis function, a p-splines basis function, a power basis function, a Fourier basis function, a wavelets function, and an exponential basis function.

4. The non-transitory computer-readable medium of claim 1, wherein a selector associated with the first window of the display provides user control of a number of functional principal components identified from the performed FPCA.

5. The non-transitory computer-readable medium of claim 1, wherein a selector associated with the first window of the display provides user selection of a type of model to train in (F).

6. The non-transitory computer-readable medium of claim 5, wherein the type of model to train is selected from the group consisting of a generalized regression model and a neural network model.

7. The non-transitory computer-readable medium of claim 5, wherein the type of model to train is a generalized regression model and a second selector associated with the first window of the display provides user selection of a response distribution method used by the generalized regression model.

8. The non-transitory computer-readable medium of claim 5, wherein the type of model to train is a generalized regression model and a second selector associated with the first window of the display provides user selection of an estimation method used by the generalized regression model.

9. The non-transitory computer-readable medium of claim 5, wherein the type of model to train is a generalized regression model and a second selector associated with the first window of the display provides user selection of a validation method used by the generalized regression model.

10. The non-transitory computer-readable medium of claim 1, wherein, after (G), a selector associated with the first window of the display provides user modification of the basis function, wherein (A) through (G) is automatically repeated with the user modification of the basis function.

11. The non-transitory computer-readable medium of claim 1, wherein, after (G), a selector associated with the first window of the display provides user modification of a type of model to train in (F), wherein (F) through (G) is automatically repeated with the user modification of the type of model to train.

12. The non-transitory computer-readable medium of claim 1, wherein a type of model to train in (F) is a generalized regression model, wherein, after (G), a selector associated with the first window of the display provides user modification of a response distribution method used by the generalized regression model, wherein (F) through (G) is automatically repeated with the user modification of the response distribution method.

13. The non-transitory computer-readable medium of claim 1, wherein a type of model to train in (F) is a generalized regression model, wherein, after (G), a selector associated with the first window of the display provides user modification of an estimation distribution method used by the generalized regression model, wherein (F) through (G) is automatically repeated with the user modification of the estimation distribution method.

14. The non-transitory computer-readable medium of claim 1, wherein a type of model to train in (F) is a generalized regression model, wherein, after (G), a selector associated with the first window of the display provides user modification of a validation method used by the generalized regression model, wherein (F) through (G) is automatically repeated with the user modification of the validation method.

15. The non-transitory computer-readable medium of claim 1, wherein, after (G), a selector associated with the first window of the display provides user modification of a current factor variable value, wherein (F) through (G) is automatically repeated with the user modification of the current factor variable value.

16. The non-transitory computer-readable medium of claim 1, wherein, after (G), a selector associated with the first window of the display provides user modification of a selected number of active effects value, wherein (F) through (G) is automatically repeated with the user modification of the selected number of active effects value.

17. The non-transitory computer-readable medium of claim 1, wherein each observation vector of each plurality of observation vectors further includes a factor variable value for each of a plurality of predefined factor variables, wherein the predefined factor variable is one of the plurality of predefined factor variables.

18. The non-transitory computer-readable medium of claim 17, wherein, after (G), a selector associated with the first window of the display provides user modification of a current factor variable value for one of the plurality of predefined factor variables, wherein (F) through (G) is automatically repeated with the user modification of the current factor variable value.

19. The non-transitory computer-readable medium of claim 18, wherein, after (F) through (G) is automatically repeated with the user modification of the current factor variable value, the computer-readable instructions further cause the computing device to output an indicator of a factor variable selected from the plurality of predefined factor variables to model the explanatory variable value.

20. The non-transitory computer-readable medium of claim 19, wherein the computer-readable instructions further cause the computing device to:
train a model using observation vector values associated with the explanatory variable, the response variable, and the selected factor variable;
read a second explanatory variable value from a scoring dataset;

compute a new response variable value using the trained model; and output the computed new response variable value.

21. The non-transitory computer-readable medium of claim 1, wherein the computer-readable instructions further cause the computing device to:

read a second explanatory variable value from a scoring dataset;

compute a new response variable value using parameters that describe the trained model with the read, second explanatory variable value; and output the computed new response variable value.

22. A computing device comprising:

a processor; and a non-transitory computer-readable medium operably coupled to the processor, the computer-readable medium having computer-readable instructions stored thereon that, when executed by the processor, cause the computing device to read a dataset that includes a plurality of observation vectors defined for each value of a plurality of values of a group variable, wherein each observation vector of each plurality of observation vectors includes an explanatory variable value of an explanatory variable and a response variable value of a response variable;

(A) fit a basis function to each plurality of observation vectors defined for each value of the plurality of values of the group variable to generate basis results, wherein the basis function is fit to the explanatory variable value and the response variable value of each observation vector of each plurality of observation vectors to define coefficients that describe the response variable based on the explanatory variable;

(B) present the generated basis results from the basis function fit to each plurality of observation vectors within a first sub-window of a first window of a display;

(C) automatically perform a functional principal component analysis (FPCA) on each basis function fit to each plurality of observation vectors to generate FPCA results;

(D) present the generated FPCA results from the performed FPCA within a second sub-window of the first window of the display, wherein the FPCA results include an eigenvalue and an eigenfunction associated with the eigenvalue for each functional principal component identified from the performed FPCA;

(E) receive an indicator of a request to perform functional analysis using the FPCA results and the dataset based on a predefined factor variable, wherein the indicator is received in association with the first window of the display, wherein each observation vector of each plurality of observation vectors further includes a factor variable value of the predefined factor variable;

(F) train a model using the eigenvalue and the eigenfunction computed as a result of the performed FPCA for each plurality of observation vectors using the factor variable value associated with each observation vector of each plurality of observation vectors as a model effect; and (G) present trained model results from the trained model within a third sub-window of the first window of the display.

23. A method of providing interactive model selection, the method comprising:

reading, by a computing device, a dataset that includes a plurality of observation vectors defined for each value of a plurality of values of a group variable, wherein each observation vector of each plurality of observation vectors includes an explanatory variable value of an explanatory variable and a response variable value of a response variable;

(A) fitting, by the computing device, a basis function to each plurality of observation vectors defined for each value of the plurality of values of the group variable to generate basis results, wherein the basis function is fit to the explanatory variable value and the response variable value of each observation vector of each plurality of observation vectors to define coefficients that describe the response variable based on the explanatory variable;

(B) presenting, by the computing device, the generated basis results from the basis function fit to each plurality of observation vectors within a first sub-window of a first window of a display;

(C) automatically performing, by the computing device, a functional principal component analysis (FPCA) on each basis function fit to each plurality of observation vectors to generate FPCA results;

(D) presenting, by the computing device, the generated FPCA results from the performed FPCA within a second sub-window of the first window of the display, wherein the FPCA results include an eigenvalue and an eigenfunction associated with the eigenvalue for each functional principal component identified from the performed FPCA;

(E) receiving, by the computing device, an indicator of a request to perform functional analysis using the FPCA results and the dataset based on a predefined factor variable, wherein the indicator is received in association with the first window of the display, wherein each observation vector of each plurality of observation vectors further includes a factor variable value of the predefined factor variable;

(F) training, by the computing device, a model using the eigenvalue and the eigenfunction computed as a result of the performed FPCA for each plurality of observation vectors using the factor variable value associated with each observation vector of each plurality of observation vectors as a model effect; and (G) presenting, by the computing device, trained model results from the trained model within a third sub-window of the first window of the display.

24. The method of claim 23, wherein, after (G), a selector associated with the first window of the display provides user modification of the basis function, wherein (A) through (G) is automatically repeated with the user modification of the basis function.

25. The method of claim 23, wherein, after (G), a selector associated with the first window of the display provides user modification of a type of model to train in (F), wherein (F) through (G) is automatically repeated with the user modification of the type of model to train.

26. The method of claim 23, wherein a type of model to train in (F) is a generalized regression model, wherein, after (G), a selector associated with the first window of the display provides user modification of a response distribution method used by the generalized regression model, wherein (F) through (G) is automatically repeated with the user modification of the response distribution method.

27. The method of claim 23, wherein, after (G), a selector associated with the first window of the display provides user modification of a current factor variable value, wherein (F) through (G) is automatically repeated with the user modification of the current factor variable value.

28. The method of claim 23, wherein each observation vector of each plurality of observation vectors further includes a factor variable value for each of a plurality of predefined factor variables, wherein the predefined factor variable is one of the plurality of predefined factor variables.

29. The method of claim 28, wherein, after (G), a selector associated with the first window of the display provides user modification of a current factor variable value for one of the plurality of predefined factor variables, wherein (F) through (G) is automatically repeated with the user modification of the current factor variable value.

30. The method of claim 29, wherein, after (F) through (G) is automatically repeated with the user modification of the current factor variable value, the computer-readable instructions further cause the computing device to output an indicator of a factor variable selected from the plurality of predefined factor variables to model the explanatory variable value.

* * * * *

UNITED STATES PATENT AND TRADEMARK OFFICE
CERTIFICATE OF CORRECTION

PATENT NO. : 10,963,788 B1
APPLICATION NO. : 16/919309
DATED : March 30, 2021
INVENTOR(S) : Ryan Jeremy Parker et al.

Page 1 of 1

It is certified that error appears in the above-identified patent and that said Letters Patent is hereby corrected as shown below:

In the Specification

Column 12, Lines 22-23:
Delete the phrase "$N_{TK} = 2N_{EK}\ N_{IK}$" and replace with --$N_{TK} = 2N_{EK} + N_{IK}$--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*